US012676983B2

(12) United States Patent
Park et al.

(10) Patent No.:  US 12,676,983 B2
(45) Date of Patent:  Jul. 7, 2026

(54) IMAGE ENCODING/DECODING METHOD AND DEVICE, AND RECORDING MEDIUM IN WHICH BITSTREAM IS STORED

(71) Applicant: LG ELECTRONICS INC., Seoul (KR)

(72) Inventors: Naeri Park, Seoul (KR); Jaehyun Lim, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/711,233

(22) PCT Filed: Nov. 18, 2022

(86) PCT No.: PCT/KR2022/018262
§ 371 (c)(1),
(2) Date: May 17, 2024

(87) PCT Pub. No.: WO2023/090924
PCT Pub. Date: May 25, 2023

(65) Prior Publication Data
US 2025/0016325 A1     Jan. 9, 2025

(30) Foreign Application Priority Data
Nov. 18, 2021     (KR) ........................ 10-2021-0158998

(51) Int. Cl.
*H04N 19/105*     (2014.01)
*H04N 19/137*     (2014.01)
*H04N 19/159*     (2014.01)
*H04N 19/176*     (2014.01)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

2021/0281877 A1     9/2021  Liu et al.
2021/0314597 A1 *   10/2021  Takehara ............. H04N 19/105
2022/0078476 A1 *   3/2022  Zhang ................. H04N 19/517

FOREIGN PATENT DOCUMENTS

KR     10-2020-0014425  A     2/2020
KR     10-2021-0068439  A     6/2021
KR        10-2286460  B1     8/2021
WO       2021/138428  A1     7/2021

* cited by examiner

*Primary Examiner* — Christopher G Findley
(74) *Attorney, Agent, or Firm* — Bryan Cave Leighton Paisner LLP

(57)     ABSTRACT

An image encoding/decoding method and device according to the present disclosure can: construct a candidate list of the current block, the candidate list comprising a plurality of candidates and the plurality of candidates including HMVP candidates; deriving motion information about the current block on the basis of the candidate list; and perform inter prediction for the current block on the basis of the motion information.

8 Claims, 20 Drawing Sheets

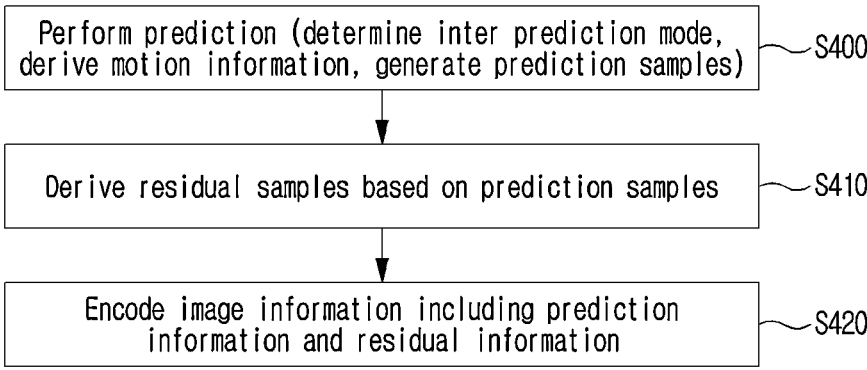

| Perform prediction (determine inter prediction mode, derive motion information, generate prediction samples) | ~S400 |

| Derive residual samples based on prediction samples | ~S410 |

| Encode image information including prediction information and residual information | ~S420 |

FIG.5

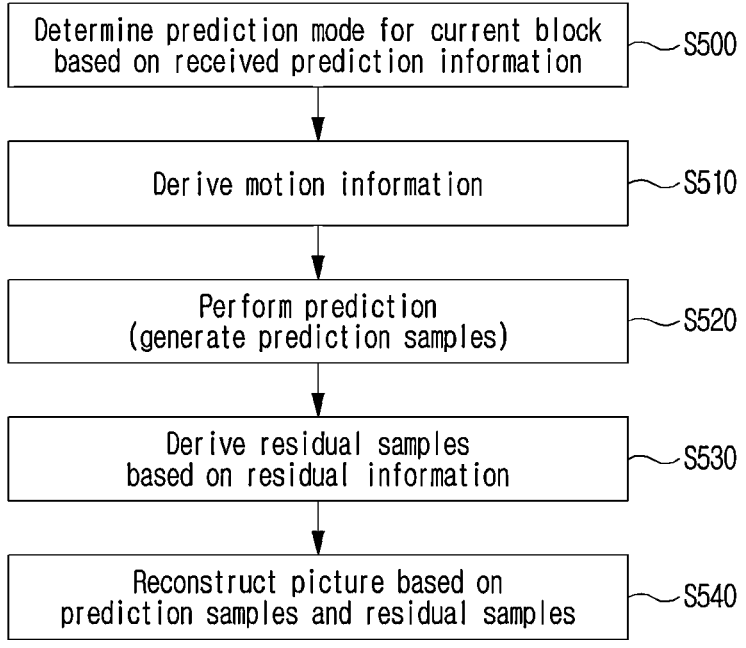

| Determine prediction mode for current block based on received prediction information | ~S500 |

| Derive motion information | ~S510 |

| Perform prediction (generate prediction samples) | ~S520 |

| Derive residual samples based on residual information | ~S530 |

| Reconstruct picture based on prediction samples and residual samples | ~S540 |

Representative sub-block         Representative sub-block

| Cand0 | Cand1 | |
|---|---|---|
| | | Cand4 |
| Cand2 | Cand3 | |
| Cand5 | INTRA | |
| Cand6 | | Current Block |
| Cand7 | Cand8 | |

| Decoded Blocks | L0/L1 |
|---|---|
| Cand0 | Bi |
| Cand1 | Bi |
| Cand2 | Uni |
| Cand3 | Bi |
| Cand4 | Uni |
| Cand5 | Bi |
| Cand6 | Bi |
| Cand7 | Uni |
| Cand8 | Uni |

FIG.14

| | HMVPCand[0] | HMVPCand[1] | HMVPCand[0] | HMVPCand[3] | HMVPCand[4] | HMVPCand[...] | HMVPCand[N-1] |
|---|---|---|---|---|---|---|---|
| L0/L1 | Cand0<br>(Inter_dir=3,<br>refIdx0,MV0,<br>refIdx1,MV1) | Cand1<br>(Inter_dir=1,<br>refIdx0,MV0) | Cand2<br>(Inter_dir=3,<br>refIdx0,MV0,<br>refIdx1,MV1) | Cand3<br>(Inter_dir=3,<br>refIdx0,MV0,<br>refIdx1,MV1) | Cand4<br>(Inter_dir=1,<br>refIdx0,MV0) | ... | ... |

| | HMVPCand[0] | HMVPCand[1] | HMVPCand[0] | HMVPCand[3] | HMVPCand[4] | HMVPCand[...] | HMVPCand[N-1] |
|---|---|---|---|---|---|---|---|
| L0 | Cand0[0]<br>(refIdx0,MV0) | Cand1[0]<br>(refIdx0,MV0) | Cand2[0]<br>(refIdx0,MV0) | Cand3[0]<br>(refIdx0,MV0) | Cand4[0]<br>(refIdx0,MV0) | ... | ... |
| L1 | Cand0[1]<br>(refIdx1,MV1) | Cand1[1]<br>(refIdx1,MV1) | Cand3[1]<br>(refIdx1,MV1) | Cand5[1]<br>(refIdx1,MV1) | Cand6[1]<br>(refIdx1,MV1) | ... | ... |

New Cand (L0/L1)

New Cand(L0)

New Cand(L1)

FIG.15

|  | HMVPCand[0] | HMVPCand[1] | HMVPCand[2] | HMVPCand[3] | HMVPCand[4] | HMVPCand[5] |
|---|---|---|---|---|---|---|
| L0 | Cand0[0]<br>(refIdx0,MV0) | Cand1[0]<br>(refIdx0,MV0) | Cand2[0]<br>(refIdx0,MV0) | Cand3[0]<br>(refIdx0,MV0) | Cand4[0]<br>(refIdx0,MV0) | Cand5[0]<br>(refIdx0,MV0) |
| L1 | Cand0[1]<br>(refIdx1,MV1) | Cand1[1]<br>(refIdx1,MV1) | Cand3[1]<br>(refIdx1,MV1) | Cand5[1]<br>(refIdx1,MV1) | - | - |

FIG.17

| | HMVPCand[0] | HMVPCand[1] | HMVPCand[2] | HMVPCand[3] | HMVPCand[4] | HMVPCand[5] |
|---|---|---|---|---|---|---|
| L0 | Cand0[0]<br>(refIdx0,MV0) | Cand1[0]<br>(refIdx0,MV0) | Cand2[0]<br>(refIdx0,MV0) | Cand3[0]<br>(refIdx0,MV0) | Cand4[0]<br>(refIdx0,MV0) | Cand5[0]<br>(refIdx0,MV0) |

| | HMVPCand[0] | HMVPCand[1] | HMVPCand[2] | HMVPCand[3] | HMVPCand[4] | HMVPCand[5] |
|---|---|---|---|---|---|---|
| L1 | Cand0[1]<br>(refIdx1,MV1) | Cand1[1]<br>(refIdx1,MV1) | Cand2[1] | Cand3[1]<br>(refIdx1,MV1) | Cand5[1]<br>(refIdx1,MV1) | - | - |

| Merge Candidates | HMVP Candidates | |
|---|---|---|
| | L0 | L1 |
| MergeCand[i] | HMVPCand[5] | - |
| MergeCand[i+1] | HMVPCand[4] | - |
| MergeCand[i+2] | HMVPCand[3] | HMVPCand[5] |
| MergeCand[i+3] | HMVPCand[2] | HMVPCand[2] |
| MergeCand[i+4] | HMVPCand[1] | HMVPCand[1] |
| ... | ... | ... |
| MergeCand[i+(M−1)] | ... | ... |

FIG.18

|  | HMVPCand[0] | HMVPCand[1] | HMVPCand[2] | HMVPCand[3] | HMVPCand[4] | HMVPCand[5] |
|---|---|---|---|---|---|---|
| L0 | Cand0[0] (refIdx0,MV0) | Cand1[0] (refIdx0,MV0) | Cand2[0] (refIdx0,MV0) | Cand3[0] (refIdx0,MV0) | Cand4[0] (refIdx0,MV0) | Cand5[0] (refIdx0,MV0) |

|  | HMVPCand[0] | HMVPCand[1] | HMVPCand[2] | HMVPCand[3] | HMVPCand[4] | HMVPCand[5] |
|---|---|---|---|---|---|---|
| L1 | Cand0[1] (refIdx1,MV1) | Cand1[1] (refIdx1,MV1) | Cand2[1] (refIdx1,MV1) | Cand3[1] (refIdx1,MV1) | - | - |

| Merge Candidates | HMVP Candidates | |
|---|---|---|
|  | L0 | L1 |
| MergeCand[i] | HMVPCand[5] | Mirrored HMVPCand[5] |
| MergeCand[i+1] | HMVPCand[4] | Mirrored HMVPCand[4] |
| MergeCand[i+2] | HMVPCand[3] | HMVPCand[5] |
| MergeCand[i+3] | HMVPCand[2] | HMVPCand[2] |
| MergeCand[i+4] | HMVPCand[1] | HMVPCand[1] |
| ... | ... | ... |
| MergeCand[i+(M-1)] |  |  |

FIG.19

| | HMVPCand[0] | HMVPCand[1] | HMVPCand[2] | HMVPCand[3] | HMVPCand[4] | HMVPCand[5] |
|---|---|---|---|---|---|---|
| L0 | Cand0[0] (refIdx0,MV0) | Cand1[0] (refIdx0,MV0) | Cand2[0] (refIdx0,MV0) | Cand3[0] (refIdx0,MV0) | Cand4[0] (refIdx0,MV0) | Cand5[0] (refIdx0,MV0) |

| | HMVPCand[0] | HMVPCand[1] | HMVPCand[2] | HMVPCand[3] | HMVPCand[4] | HMVPCand[5] |
|---|---|---|---|---|---|---|
| L1 | Cand0[1] (refIdx1,MV1) | Cand1[1] (refIdx1,MV1) | Mirrored Cand[2] | Cand3[1] (refIdx1,MV1) | Mirrored Cand[4] | Cand5[1] (refIdx1,MV1) |

| Merge Candidates | HMVP Candidates | |
|---|---|---|
| | L0 | L1 |
| MergeCand[i] | HMVPCand[5] | HMVPCand[5] |
| MergeCand[i+1] | HMVPCand[4] | HMVPCand[4] |
| MergeCand[i+2] | HMVPCand[3] | HMVPCand[5] |
| MergeCand[i+3] | HMVPCand[2] | HMVPCand[2] |
| MergeCand[i+4] | HMVPCand[1] | HMVPCand[1] |
| ... | ... | ... |
| MergeCand[i+(M-1)] | ... | ... |

FIG.21

| Merge Candidates | HMVP Candidates | |
|---|---|---|
| | L0 | L1 |
| MergeCand[i] | HMVPCand[5] | HMVPCand[3] |
| MergeCand[i+1] | HMVPCand[4] | HMVPCand[3] |
| MergeCand[i+2] | HMVPCand[5] | HMVPCand[2] |
| MergeCand[i+3] | HMVPCand[4] | HMVPCand[2] |
| MergeCand[i+4] | HMVPCand[4] | HMVPCand[1] |
| ... | ... | ... |
| MergeCand[i+(M-1)] | ... | ... |

Figure 23:
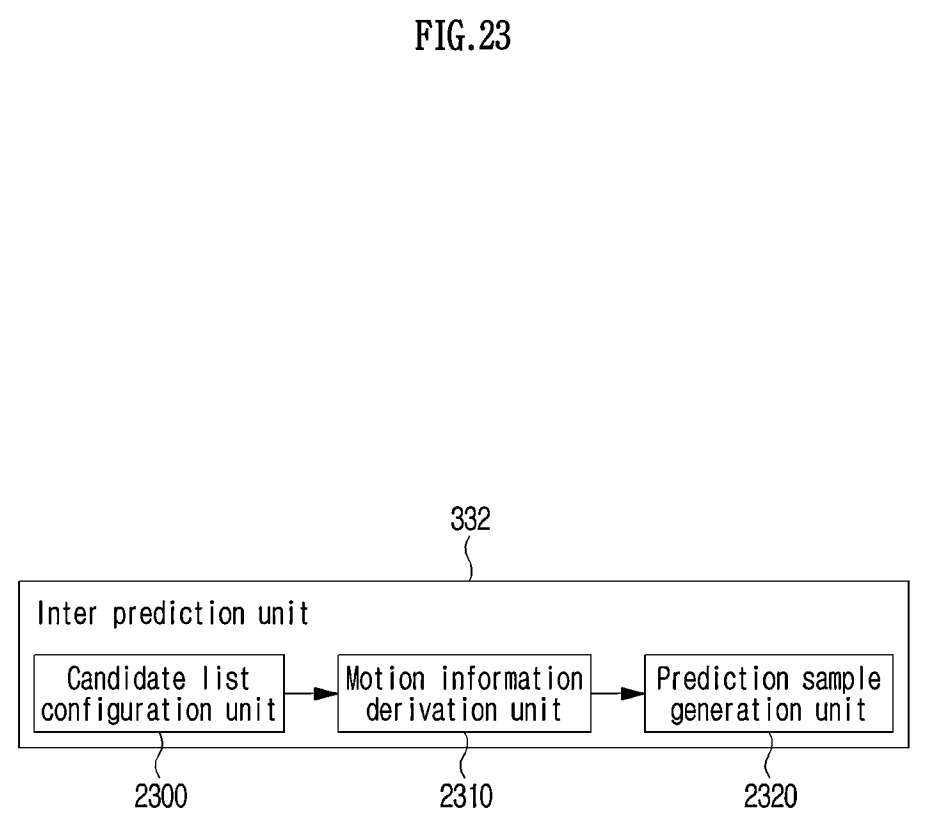

Inter prediction unit

Candidate list
configuration unit

2300

Motion information
derivation unit

2310

Prediction sample
generation unit

2320

1

IMAGE ENCODING/DECODING METHOD AND DEVICE, AND RECORDING MEDIUM IN WHICH BITSTREAM IS STORED

CROSS-REFERENCE TO RELATED APPLICATIONS

This application is the National Stage filing under 35 U.S.C. 371 of International Application No. PCT/KR2022/018262, filed on Nov. 18, 2022, which claims the benefit of earlier filing date and right of priority to Korean Application No. 10-2021-0158998, filed on Nov. 18, 2021, the contents of which are all incorporated by reference herein in their entireties.

TECHNICAL FIELD

The present disclosure relates to an image encoding/decoding method and device, and a recording medium storing a bitstream, and more particularly, relates to an image encoding/decoding method and device using inter prediction, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure intends to provide an inter prediction method and device.

In the next-generation standard technology currently under discussion, a non-adjacent spatial candidate may be used for motion prediction, which increases an overlapping possibility between a candidate included in a motion candidate list of a merge/inter mode and a candidate included in a HMVP list.

Accordingly, the present disclosure intends to provide a method and a device for reducing this overlap and considering more diverse candidates.

The present disclosure intends to provide a method and a device for storing and using motion information of a previously coded block based on a list individually configured according to a prediction direction.

An image decoding method and device according to the present disclosure may construct a candidate list of a current block, wherein the candidate list includes a plurality of candidates and the plurality of candidates include a HMVP candidate; derive motion information about the current block based on the candidate list, and perform inter prediction for the current block based on the motion information.

In an image decoding method and device according to the present disclosure, the HMVP candidate may be derived based on a plurality of HMVP lists, and the plurality of HMVP lists may include a first HMVP list and a second HMVP list.

In an image decoding method and device according to the present disclosure, a candidate included in the first HMVP list may have only L0 motion information, and a candidate included in the second HMVP list may have only L1 motion information.

In an image decoding method and device according to the present disclosure, the L0 motion information may include at least one of a L0 reference index or a L0 motion vector, and the L1 motion information may include at least one of a L1 reference index or a L1 motion vector.

In an image decoding method and device according to the present disclosure, whether a candidate having the same motion information exists in a HMVP list may be individually confirmed for each of the first HMVP list and the second HMVP list.

In an image decoding method and device according to the present disclosure, the HMVP candidate may be derived by bi-directional motion information generated based on a combination of a first candidate included in the first HMVP list and a second candidate included in the second HMVP list.

In an image decoding method and device according to the present disclosure, the HMVP candidate may be derived by using a candidate with the same index value in the first HMVP list and the second HMVP list, and the index value may be individually allocated to a candidate included in each of the first HMVP list and the second HMVP list.

In an image decoding method and device according to the present disclosure, when a candidate specified by the index value exists only in any one of the first HMVP list and the second HMVP list, a motion vector of a first direction of the HMVP candidate may be derived as a motion vector of a candidate specified by the index value, and a motion vector of a second direction of the HMVP candidate may be derived as a value that a size is equal and a sign is opposite to a motion vector of the first direction.

In an image decoding method and device according to the present disclosure, the HMVP candidate may be derived based on an average of a predetermined candidate included in each of the first HMVP list and the second HMVP list.

In an image decoding method and device according to the present disclosure, the HMVP candidate may be derived by using a candidate having a predetermined index value in the first HMVP list and the second HMVP list, respectively, and the index value may be individually allocated to a candidate included in each of the first HMVP list and the second HMVP list.

An image encoding method and device according to the present disclosure may construct a candidate list of a current block, wherein the candidate list includes a plurality of candidates and the plurality of candidates include a HMVP candidate; determine motion information about the current block based on the candidate list, and perform inter prediction for the current block based on the motion information.

In an image encoding method and device according to the present disclosure, the HMVP candidate may be derived based on a plurality of HMVP lists, and the plurality of HMVP lists may include a first HMVP list and a second HMVP list.

In an image encoding method and device according to the present disclosure, a candidate included in the first HMVP list may have only L0 motion information, and a candidate included in the second HMVP list may have only L1 motion information.

In an image encoding method and device according to the present disclosure, the L0 motion information may include at least one of a L0 reference index or a L0 motion vector, and the L1 motion information may include at least one of a L1 reference index or a L1 motion vector.

In an image encoding method and device according to the present disclosure, whether a candidate having the same motion information exists in a HMVP list may be individually confirmed for each of the first HMVP list and the second HMVP list.

In an image encoding method and device according to the present disclosure, the HMVP candidate may be derived by bi-directional motion information generated based on a combination of a first candidate included in the first HMVP list and a second candidate included in the second HMVP list.

In an image encoding method and device according to the present disclosure, the HMVP candidate may be derived by using a candidate with the same index value in the first HMVP list and the second HMVP list, and the index value may be individually allocated to a candidate included in each of the first HMVP list and the second HMVP list.

In an image encoding method and device according to the present disclosure, when a candidate specified by the index value exists only in any one of the first HMVP list and the second HMVP list, a motion vector of a first direction of the HMVP candidate may be derived as a motion vector of a candidate specified by the index value, and a motion vector of a second direction of the HMVP candidate may be derived as a value that a size is equal and a sign is opposite to a motion vector of the first direction.

In an image encoding method and device according to the present disclosure, the HMVP candidate may be derived based on an average of a predetermined candidate included in each of the first HMVP list and the second HMVP list.

In an image encoding method and device according to the present disclosure, the HMVP candidate may be derived by using a candidate having a predetermined index value in the first HMVP list and the second HMVP list, respectively, and the index value may be individually allocated to a candidate included in each of the first HMVP list and the second HMVP list.

A computer-readable digital storage medium storing encoded video/image information resulting in performing an image decoding method due to a decoding device according to the present disclosure is provided.

A computer-readable digital storage medium storing video/image information generated according to an image encoding method according to the present disclosure is provided.

A method and a device for transmitting data on video/image information generated according to an image encoding method according to the present disclosure are provided.

According to the present disclosure, the accuracy of prediction may be improved by reducing a possibility of overlap between candidates increased as a variety of tools are added and considering more diverse candidates.

The present disclosure may improve compression efficiency by storing and using motion information of a previously coded block based on a list individually configured according to a prediction direction.

BRIEF DESCRIPTION OF THE DRAWINGS

FIG. 2 shows a rough block diagram of an encoding device to which an embodiment of the present disclosure may be applied and encoding of a video/image signal is performed.

FIG. 4 shows an example of an inter prediction-based video/image encoding method to which an embodiment of the present disclosure may be applied.

FIG. 5 shows an example of an inter prediction-based video/image decoding method to which an embodiment of the present disclosure may be applied.

FIG. 14 is a diagram illustrating a method for configuring a candidate list according to an embodiment of the present disclosure.

FIGS. 15 and 16 are a diagram illustrating a candidate derivation method based on a separated candidate list according to an embodiment of the present disclosure.

FIG. 17 is a diagram illustrating a candidate derivation method based on a separated candidate list according to an embodiment of the present disclosure.

FIG. 18 is a diagram illustrating a candidate derivation method based on a separated candidate list according to an embodiment of the present disclosure.

FIG. 19 is a diagram illustrating a candidate derivation method based on a separated candidate list according to an embodiment of the present disclosure.

FIG. 21 is a diagram illustrating a candidate derivation method based on a separated candidate list according to an embodiment of the present disclosure.

FIG. 23 shows a rough configuration of an inter predictor that performs an image decoding method according to an embodiment of the present disclosure.

DETAILED DESCRIPTION

Figure 1:
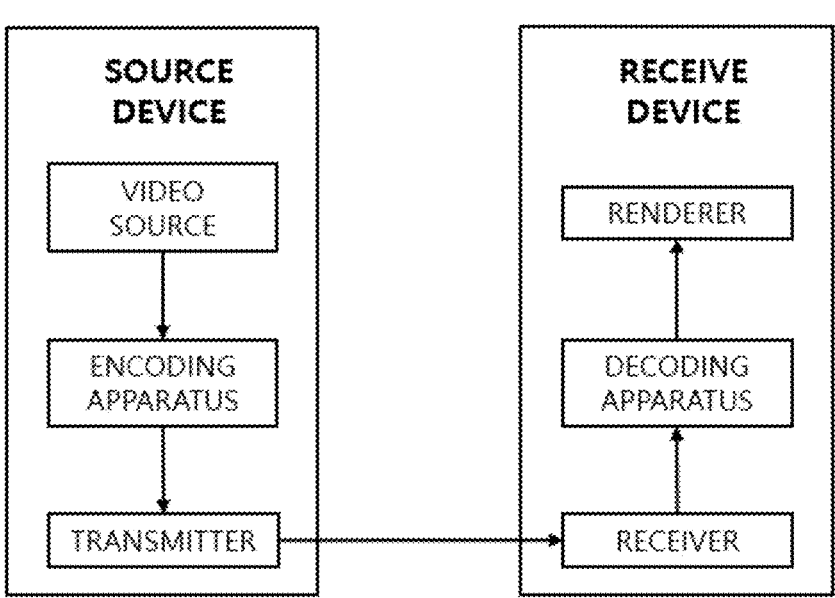
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding device and a transmission unit. The receiving device may include a reception unit, a decoding device and a renderer. The encoding device may be referred to as a video/image encoding device and the decoding device may be referred to as a video/image decoding device. A transmitter may be included in an encoding device. A receiver may be included in a decoding device. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/ an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding device may encode an input video/image. An encoding device may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/ communication network. A reception unit may receive/ extract the bitstream and transmit it to a decoding device.

A decoding device may decode a video/an image by performing a series of procedures such dequantization, inverse transform, prediction, etc. corresponding to an operation of an encoding device.

A renderer may render a decoded video/image. A rendered video/image may be displayed through a display unit.

Figure 2:
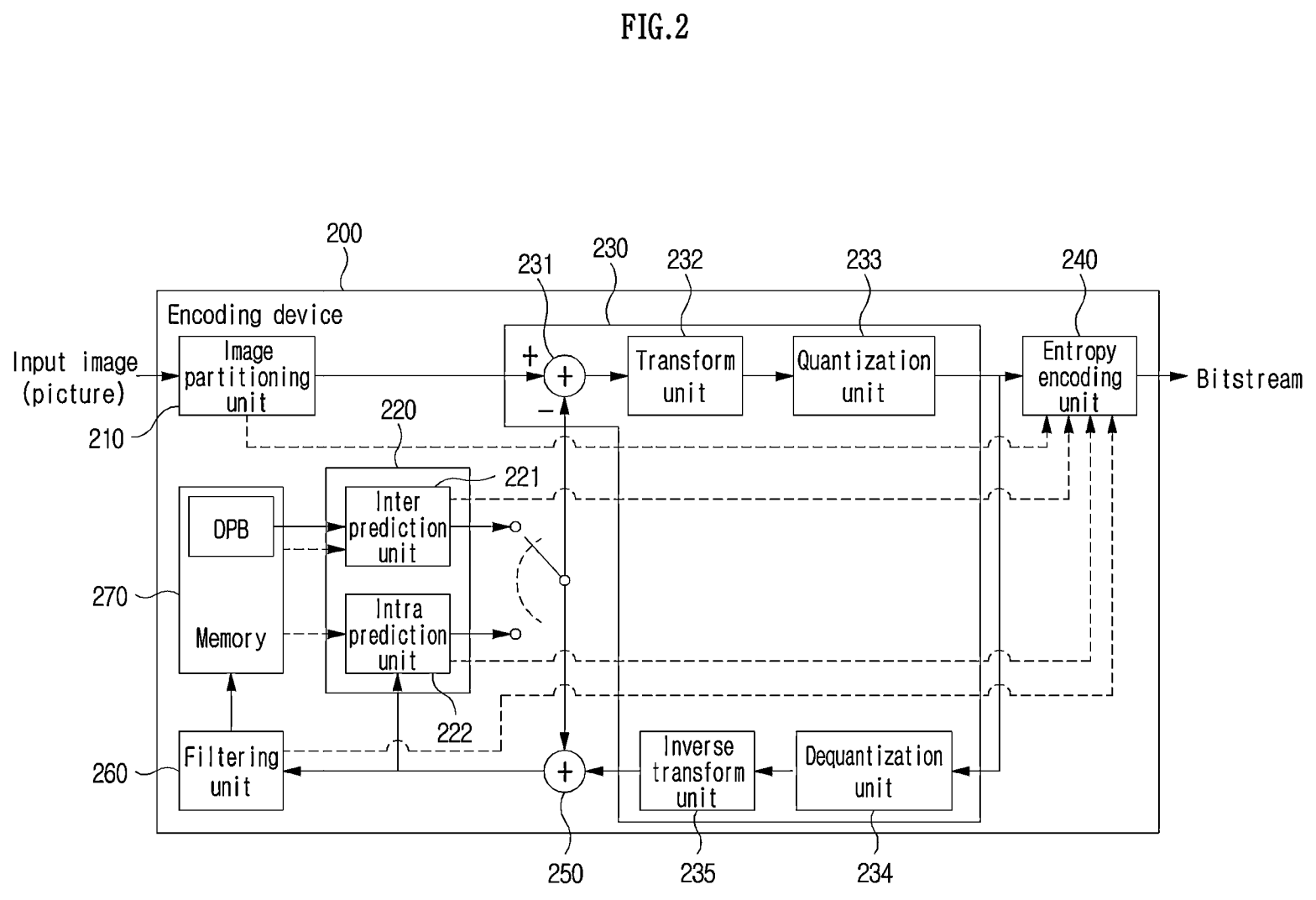

FIG. 2 shows a rough block diagram of an encoding device to which an embodiment of the present disclosure may be applied and encoding of a video/image signal is performed.

Referring to FIG. 2, an encoding device 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding device 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding device 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding device 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding device to a decoding device may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding device 200, or transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictpr 221. When inter prediction is applied through it, an encoding device may avoid prediction mismatch in an encoding device 200 and a decoding device, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
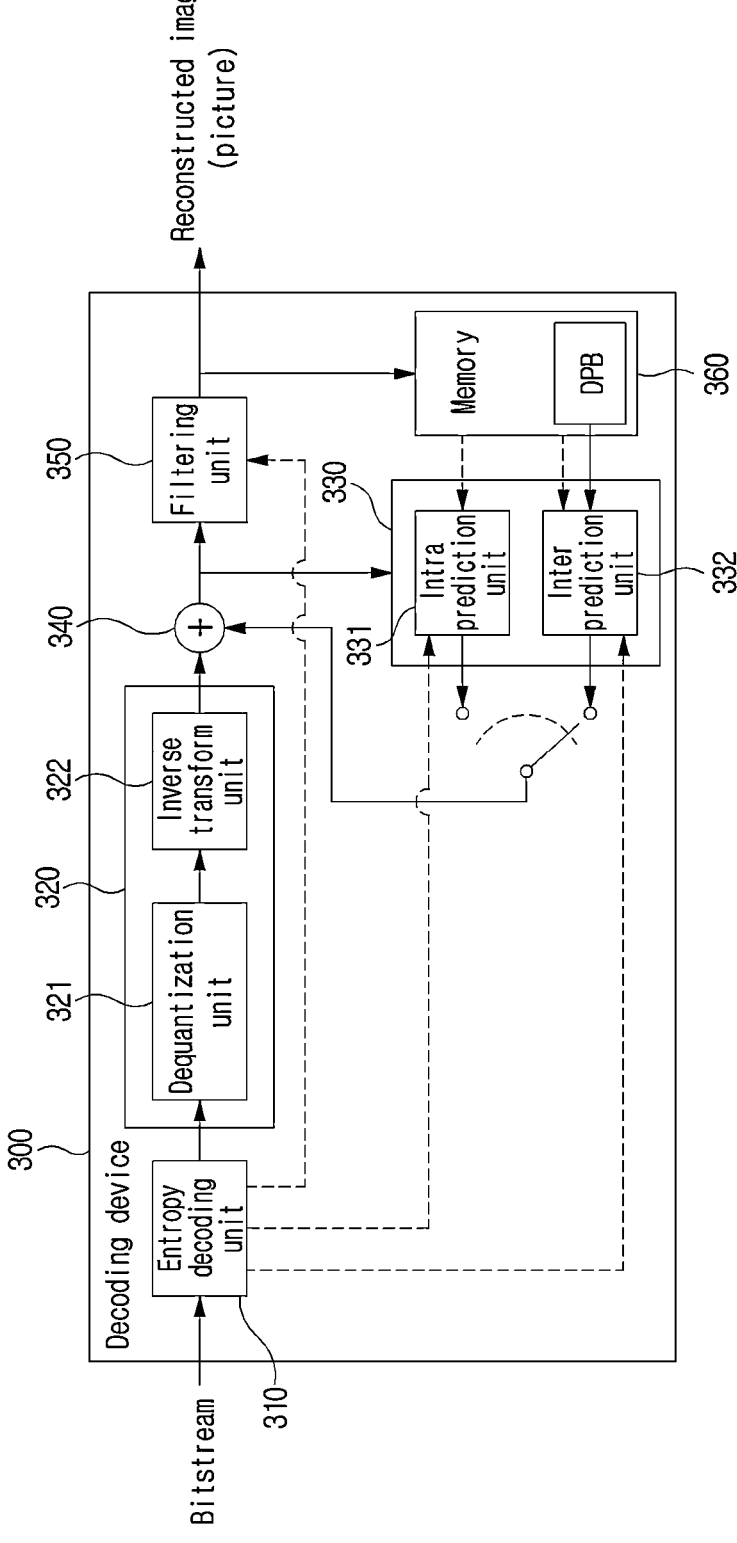
FIG. 3 shows a rough block diagram of a decoding device to which an embodiment of the present disclosure may be applied and decoding of a video/image signal is performed.

FIG. 3 shows a rough block diagram of a decoding device to which an embodiment of the present disclosure may be applied and decoding of a video/image signal is performed.

Referring to FIG. 3, a decoding device 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding device 300 may reconstruct an image in response to a process in which video/image information is processed in an encoding device of FIG. 2. For example, a decoding device 300 may derive units/blocks based on block partition-related information obtained from the bitstream. A decoding device 300 may perform decoding by using a processing unit applied in an encoding device. Accordingly, a processing unit of decoding may be a coding unit, and a coding unit may be partitioned from a coding tree unit or the larger coding unit according to a quad tree structure, a binary tree structure and/or a ternary tree structure. At least one transform unit may be derived from a coding unit. And, a reconstructed image signal decoded and output through a decoding device 300 may be played through a playback device.

A decoding device 300 may receive a signal output from an encoding device of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding device may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/ bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding device may be further configured as an internal/external element of a decoding device 300 or a reception unit may be a component of an entropy decoder 310.

Meanwhile, a decoding device according to this specification may be referred to as a video/image/picture decoding device, and the decoding device may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding device. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding device 200 may be also applied equally or correspondingly to a filter 350, an inter predictor 332 and an intra predictor 331 of a decoding device 300, respectively.

Meanwhile, when inter prediction is applied, a predictor of an encoding device/a decoding device may perform inter prediction in a unit of a block to derive a prediction sample. Inter prediction can be a prediction derived in a manner that is dependent on data elements (ex. sample values or motion information) of picture(s) other than the current picture). When inter prediction is applied to a current block, a predicted block (a prediction sample array) for a current block may be derived based on a reference block (a reference sample array) specified by a motion vector on a reference picture indicated by a reference picture index. In this case, in order to reduce the amount of motion information transmitted in an inter prediction mode, motion information of a current block may be predicted in a unit of a block, a sub-block or a sample based on a correlation of motion information between a neighboring block and a current block. The motion information may include a motion vector and a reference picture index. The motion information may further include inter prediction type (L0 prediction, L1 prediction, Bi prediction, etc.) information. When inter prediction is applied, a neighboring block may include a spatial neighboring block existing in a current picture and a temporal neighboring block existing in a reference picture. A reference picture including the reference block and a reference picture including the temporal neighboring block may be the same or different. The temporal neighboring block may be called a collocated reference block, a collocated CU (colCU), etc., and a reference picture including the temporal neighboring block may be called a collocated picture (colPic). For example, a motion information candidate list may be constructed based on neighboring blocks of a current block, and flag or index information indicating which candidate is selected (used) to derive a motion vector and/or a reference picture index of the current block may be signaled. Inter prediction may be performed based on various prediction modes, and for example, for a skip mode and a merge mode, motion information of a current block may be the same as motion information of a selected neighboring block. For a skip mode, unlike a merge mode, a residual signal may not be transmitted. For a motion vector prediction (MVP) mode, a motion vector of a selected neighboring block may be used as a motion vector predictor, and a motion vector difference may be signaled. In this case, a motion vector of the current block may be derived by using a sum of the motion vector predictor and the motion vector difference.

The motion information may include L0 motion information and/or L1 motion information according to an inter prediction type (L0 prediction, L1 prediction, Bi prediction, etc.). A motion vector in a L0 direction may be called a L0 motion vector or MVL0, and a motion vector in a L1 direction may be called a L1 motion vector or MVL1. Prediction based on a L0 motion vector may be called L0 prediction, prediction based on a L1 motion vector may be called L1 prediction, and prediction based on both the L0 motion vector and the L1 motion vector may be called bi-prediction. Here, a L0 motion vector may represent a motion vector associated with a reference picture list L0 (L0), and a L1 motion vector may represent a motion vector associated with a reference picture list L1 (L1). Reference picture list L0 may include pictures that are earlier than the current picture in output order as reference pictures, and reference picture list L1 may include pictures that are later than the current picture in output order. The previous pictures may be called a forward (reference) picture, and the subsequent pictures may be called a reverse (reference) picture. The reference picture list L0 may further include pictures that are later than the current picture in output order as reference pictures. In this case, the previous pictures may be indexed first within the reference picture list L0 and the subsequent pictures may be indexed next. The reference picture list L1 may further include pictures that are earlier than the current picture in output order as reference pictures. In this case, the subsequent pictures may be indexed first within the reference picture list 1 and the previous pictures may be indexed next. Here, output order may correspond to picture order count (POC) order.

A video/image encoding procedure based on inter prediction may roughly include, for example, the following.

FIG. 4 shows an example of an inter prediction-based video/image encoding method to which an embodiment of the present disclosure may be applied.

An encoding device may perform inter prediction on a current block S400. An encoding device may derive an inter prediction mode and motion information of a current block and generate prediction samples of the current block. Here, procedure for determining an inter prediction mode, deriving motion information and generating prediction samples may be performed simultaneously, or any one procedure may be performed before other procedures. For example, an inter predictor of an encoding device may include a prediction mode determination unit, a motion information derivation unit, and a prediction sample derivation unit, and a prediction mode determination unit may determine a prediction mode for the current block, a motion information derivation unit may derive motion information of the current block and a prediction sample derivation unit may derive prediction samples of the current block.

For example, an inter predictor of an encoding device may search for a block similar to the current block within a certain region (a search region) of reference pictures through motion estimation, and may derive a reference block whose difference from the current block is minimum or less than or equal to a certain standard. Based on this, a reference picture index indicating a reference picture where the reference block is positioned may be derived, and a motion vector may be derived based on a position difference between the reference block and the current block. An encoding device may determine a mode applied to the current block among various prediction modes. An encoding device may compare a RD cost for the various prediction modes and determine an optimal prediction mode for the current block.

For example, when a skip mode or a merge mode is applied to the current block, an encoding device may configure a merge candidate list which will be described later and derive a reference block whose difference from the current block is minimum or less than or equal to a certain standard among reference blocks indicated by merge candidates included in the merge candidate list. In this case, a merge candidate associated with the derived reference block is selected, and merge index information indicating the selected merge candidate may be generated and signaled to a decoding device. Motion information of the current block may be derived by using motion information of the selected merge candidate.

As another example, when a (A) MVP mode is applied to the current block, an encoding device may configure a (A) MVP candidate list which will be described later and use a motion vector of a MVP candidate selected among motion vector predictor (MVP) candidates included in the (A) MVP candidate list as a MVP of the current block. In this case, for example, a motion vector indicating a reference block derived by the above-described motion estimation may be used as a motion vector of the current block, and among the MVP candidates, a MVP candidate having a motion vector with the smallest difference from a motion vector of the current block may become the selected MVP candidate. A motion vector difference (MVD), which is a difference obtained by subtracting the MVP from a motion vector of the current block, may be derived. In this case, information on the MVD may be signaled to a decoding device. In addition, when a (A) MVP mode is applied, a value of the reference picture index may be configured as reference picture index information and separately signaled to the decoding device.

An encoding device may derive residual samples based on the prediction samples S410. An encoding device may derive the residual samples through comparison between original samples of the current block and the prediction samples.

An encoding device encodes image information including prediction information and residual information S420. An encoding device may output encoded image information in a bitstream form. The prediction information is information related to the prediction procedure, and it may include prediction mode information (ex. a skip flag, a merge flag, a mode index, etc.) and information on motion information. The information motion information may include candidate selection information (ex. a merge index, a MVP flag, a MVP index) which is information for deriving a motion vector. In addition, the information on motion information may include information on the above-described MVD and/or reference picture index information. In addition, the information on motion information may include information showing whether L0 prediction, L1 prediction or bi-prediction is applied. The residual information is information about the residual samples. The residual information may include information about quantized transform coefficients for the residual samples.

An output bitstream may be transmitted to a decoding device by being stored in a (digital) storage medium, or may be transmitted to a decoding device through a network.

Meanwhile, as described above, an encoding device may generate a reconstructed picture (including reconstructed samples and a reconstructed block) based on the reference samples and the residual samples. It is to derive the same prediction result as that performed from a decoding device from an encoding device, and through this, coding efficiency may be improved. Accordingly, an encoding device may store a reconstructed picture (or reconstructed samples or a reconstructed block) in a memory and use it as a reference picture for inter prediction. As described above, an in-loop filtering procedure, etc. may be further applied to the reconstructed picture.

A video/picture decoding procedure based on inter prediction may roughly include, for example, the following.

FIG. 5 shows an example of an inter prediction-based video/image decoding method to which an embodiment of the present disclosure may be applied.

Referring to FIG. 5, a decoding device may perform an operation corresponding to an operation performed by the encoding device. A decoding device may perform prediction on a current block and derive prediction samples based on received prediction information.

Specifically, a decoding device may determine a prediction mode for a current block based on received prediction information S500. A decoding device may determine an inter prediction mode applied to a current block based on prediction mode information in received prediction information.

For example, whether a merge mode is applied to a current block or whether a (A) MVP mode is determined may be determined based on a merge flag. Alternatively, one of various inter prediction mode candidates may be selected based on a mode index. The inter prediction mode candidates may include a skip mode, a merge mode, and/or a (A) MVP mode, or may include various inter prediction modes described later.

A decoding device may derive motion information of the current block based on the determined inter prediction mode S510. For example, when a skip mode or a merge mode is applied to the current block, a decoding device may configure a merge candidate list which will be described later and select one merge candidate among merge candidates included in the merge candidate list. The selection may be performed based on the above-described selection information (e.g., a merge index). Motion information of the current block may be derived by using motion information of the selected merge candidate. Motion information of the selected merge candidate may be used as motion information of the current block.

As another example, when a (A) MVP mode is applied to the current block, a decoding device may configure a (A) MVP candidate list which will be described later and use a motion vector of a MVP candidate selected among motion vector predictor (MVP) candidates included in the (A) MVP candidate list as a MVP of the current block. The selection may be performed based on the above-described selection information (a mvp flag or a mvp index). In this case, a MVD of the current block may be derived based on information about the MVD, and a motion vector of the current block may be derived based on a MVP of the current block and the MVD. In addition, a reference picture index of the current block may be derived based on the reference picture index information. A picture indicated by the reference picture index within a reference picture list for the current block may be derived as a reference picture referred to for inter prediction of the current block.

Meanwhile, as described later, motion information of the current block may be derived without configuring a candidate list, and in this case, motion information of the current block may be derived according to a procedure initiated in a prediction mode described later. In this case, a candidate list configuration as described above may be omitted.

A decoding device may generate prediction samples for the current block based on motion information of the current block S520. In this case, the reference picture may be derived based on a reference picture index of the current block, and prediction samples of the current block may be derived by using samples of a reference block indicated by a motion vector of the current block on the reference picture. In this case, as described later, in some cases, a prediction sample filtering procedure may be further performed on all or some of prediction samples of the current block.

For example, an inter predictor of a decoding device may include a prediction mode determination unit, a motion information derivation unit and a prediction sample derivation unit, and may determine a prediction mode for the current block based on prediction mode information received from a prediction mode determination unit, derive motion information (a motion vector and/or a reference picture index, etc.) of the current block based on information about motion information received from a motion information deriving unit and derives prediction samples of the current block from a prediction sample derivation unit.

A decoding device generates residual samples for the current block based on received residual information S530. A decoding device may generate reconstructed samples for the current block based on the prediction samples and the residual samples and generate a reconstructed picture based on it S540. As described above, an in-loop filtering procedure, etc. may be further applied to the reconstructed picture.

Figure 6:
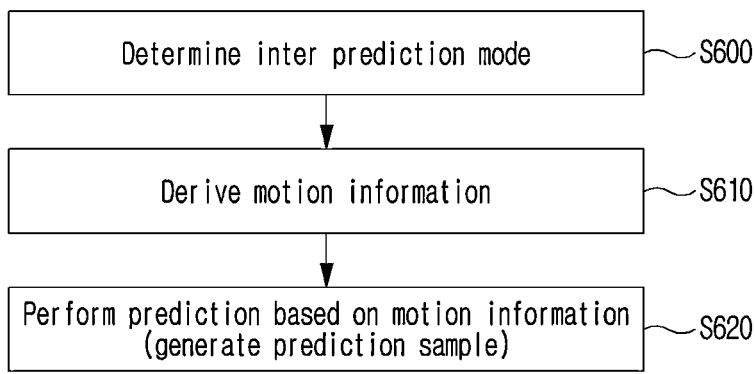
FIG. 6 exemplarily shows an inter prediction procedure to which an embodiment of the present disclosure may be applied.

FIG. 6 exemplarily shows an intra prediction procedure to which an embodiment of the present disclosure may be applied.

Referring to FIG. 6, as described above, an inter prediction procedure may include determining an inter prediction mode, deriving motion information according to a determined prediction mode and performing prediction (generating a prediction sample) based on derived motion information. The inter prediction procedure may be performed in an encoding device and a decoding device as described above. Herein, a coding device may include an encoding device and/or a decoding device.

Referring to FIG. 6, a coding device may determine an inter prediction mode for a current block S600. A variety of inter prediction modes may be used to predict a current block in a picture. For example, a variety of modes including a merge mode, a skip mode, a motion vector prediction (MVP) mode, an affine mode, a sub-block merge mode, a merge with MVD (MMVD) mode, etc. may be used. A decoder side motion vector refinement (DMVR) mode, an adaptive motion vector resolution (AMVR) mode, a bi-prediction with CU-level weight (BCW), a bi-directional optical flow (BDOF), etc. may be used further or instead as an additional mode. An affine mode may be also called a affine motion prediction mode. A MVP mode may be also called an advanced motion vector prediction (AMVP) mode. Herein, some modes and/or motion information candidates derived by some modes may be included as one of motion information-related candidates of another mode. For example, a HMVP candidate may be added as a merge candidate of the merge/skip mode, or may be added as a MVP candidate of the MVP mode. When the HMVP candidate is used as a motion information candidate of the merge mode or skip mode, the HMVP candidate may be called a HMVP merge candidate.

Prediction mode information indicating an inter prediction mode of a current block may be signaled from an encoding device to a decoding device. The prediction mode information may be included in a bitstream and received by a decoding device. The prediction mode information may include index information indicating one of multiple candidate modes. Alternatively, an inter prediction mode may be indicated through hierarchical signaling of flag information. In this case, the prediction mode information may include at least one flag. For example, a skip flag is signaled to indicate whether to apply a skip mode, and if a skip mode is not applied, a merge flag is signaled to indicate whether to apply a merge mode, and if a merge mode is not applied, a MVP mode may be indicated to be applied or a flag for additional division may be further signaled. An affine mode may be signaled in an independent mode, or may be signaled in a dependent mode such as a merge mode or a MVP mode. For example, an affine mode may include an affine merge mode and an affine MVP mode.

A coding device derives motion information for the current block S610. The motion information may be derived based on the inter prediction mode.

A coding device may perform inter prediction by using motion information of a current block. An encoding device may derive optimal motion information for a current block through a motion estimation procedure. For example, an encoding device may use an original block in an original picture for a current block to search for a similar reference block with a high correlation in a unit of a fractional pixel within a determined search range in a reference picture, and derive motion information through this. Similarity of a block may be derived based on a difference between phase-based sample values. For example, similarity of a block may be calculated based on a SAD between a current block (or a template of a current block) and a reference block (or a template of a reference block). In this case, motion information may be derived based on a reference block with the smallest SAD in a search area. Derived motion information may be signaled to a decoding device according to various methods based on an inter prediction mode.

A coding device performs inter prediction based on motion information for the current block S620. A coding device may derive prediction sample(s) for the current block based on the motion information. A current block including the prediction samples may be referred to as a prediction block.

Figure 7:
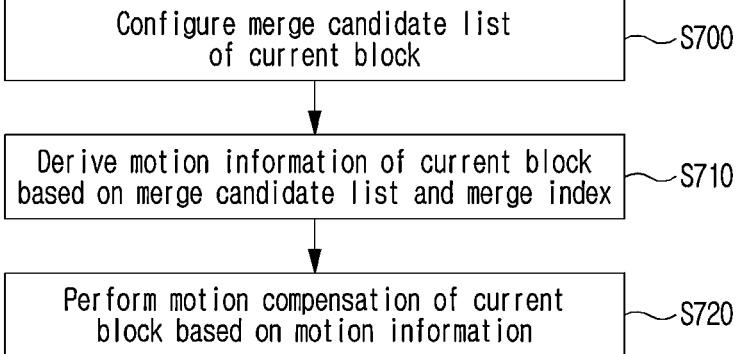
FIG. 7 shows a merge mode-based inter prediction method according to an embodiment of the present disclosure.

FIG. 7 shows a merge mode-based inter prediction method according to an embodiment of the present disclosure.

Motion information (a motion vector, a reference picture index, etc.) of a current coding unit may be derived from motion information of a neighboring blocks without being encoded. Motion information of any one of neighboring blocks may be configured as motion information of a current coding unit, which is defined as a merge mode. In describing an embodiment below, for convenience of description, it is described on the premise that a merge mode is applied, but it is not limited thereto. Substantially the same method may be applied even when a mode other than a merge mode (e.g., a (A) MVP mode) is applied.

Referring to FIG. 7, a decoding device may configure a merge candidate list of a current block S700. A merge candidate list may include one or a plurality of merge candidates that may be used to derive motion information of a current block. As an example, in an AMVP mode, the merge candidate list may be an AMVP candidate list or a MVP candidate list.

A size of a merge candidate list may be variably determined based on information indicating the maximum number of merge candidates configuring a merge candidate list (hereinafter, size information). The size information may be encoded and signaled in an encoding device, or may be a fixed value (e.g., an integer of 2, 3, 4, 5, 6 or more) pre-promised in a decoding device.

A plurality of merge candidates included in a merge candidate list may include at least one of a spatial merge candidate or a temporal merge candidate.

A spatial merge candidate may refer to a neighboring block spatially adjacent to a current block or motion information of the neighboring block. Here, a neighboring block may include at least one of a bottom-left block (A0), a left block (A1), a top-right block (B0), a top block (B1) or a top-left block (B2) of a current block. According to predetermined priority order, an available neighboring block among the neighboring blocks may be sequentially added to a merge candidate list. For example, a priority may be defined as $B1 \rightarrow A1 \rightarrow B0 \rightarrow A1 \rightarrow B2$, $A1 \rightarrow B1 \rightarrow A0 \rightarrow B1 \rightarrow B2$, $A1 \rightarrow B1 \rightarrow B0 \rightarrow A0 \rightarrow B2$, etc., but it not limited thereto.

A temporal merge candidate may refer to one or more co-located blocks belonging to a co-located picture or motion information of the co-located block. Here, a co-located picture is any one of a plurality of reference pictures belonging to a reference picture list, which may be a picture different from a picture to which a current block belongs. A co-located picture may be a first picture or a last picture in a reference picture list. Alternatively, a co-located picture may be specified based on an index encoded to indicate a co-located picture. A co-located block may include at least one of block C1 including a center position of a current block or neighboring block C0 adjacent to a bottom-right corner of a current block. According to predetermined priority order, an available block among C0 and C1 above may be sequentially added to a merge candidate list. For example, C0 may have a higher priority than C1. However, it is not limited thereto, and C1 may have a higher priority than C0.

An encoding/decoding device may include a buffer that stores motion information of at least one block that is encoded/decoded before a current block (hereinafter, a previous block). In other words, a buffer may store a list (hereinafter, a motion information list) configured with motion information of a previous block.

The motion information list may be initialized in a unit of any one of a picture, a slice, a tile, a CTU row or a CTU. Initialization may mean that a motion information list is empty. Motion information of a corresponding previous block is sequentially added to a motion information list according to encoding/decoding order of a previous block, but a motion information list may be updated in a first-in first-out (FIFO) manner considering a size of a motion information list. For example, if the most recently encoded/decoded motion information (hereinafter, recent motion information) is the same as motion information that is pre-added to a motion information list, recent motion information may not be added to a motion information list. Alternatively, the same motion information as recent motion information may be removed from a motion information list, and recent motion information may be added to a motion information list. In this case, recent motion information may be added to a last position of a motion information list or may be added to a position of removed motion information. A method for configuring and updating a motion information list is discussed by referring to FIGS. 8 to 10.

A previous block may include at least one of one or more neighboring blocks that are spatially adjacent to a current block or one or more neighboring blocks that are not spatially adjacent to a current block.

A merge candidate list may further include a previous block belonging to a buffer or a motion information list or motion information of a previous block as a merge candidate.

For this purpose, redundancy check between a motion information list and a merge candidate list may be performed. Redundancy check may be performed on all or part of merge candidates belonging to a merge candidate list and all or part of previous blocks in a motion information list. However, for convenience of a description, it is assumed that redundancy check in the present disclosure is performed on part of merge candidates belonging to a merge candidate list and part of previous blocks in a motion information list. Here, some merge candidates in a merge candidate list may include at least one of a left block or a top block among spatial merge candidates. However, it is not limited thereto, and may be limited to any one block among spatial merge candidates. For example, part of the merge candidates may further include at least one of a bottom-left block, a top-right block, a top-left block or a temporal merge candidate. Some previous blocks in a motion information list may refer to K previous blocks recently added to a motion information list. Here, K is 1, 2, 3 or more, and may be a fixed value that is pre-promised in an encoding/decoding device.

For example, it is assumed that five previous blocks (or motion information of a previous block) are stored in a motion information list and index 1 to 5 is allocated to each previous block. As an index is larger, it refers to a previous block that is recently stored. In this case, redundancy of motion information between a previous block with index 5, 4 and 3 and some merge candidates in a merge candidate list may be checked. Alternatively, redundancy between a previous block with index 5 and 4 and some merge candidates in a merge candidate list may be also checked. Alternatively, excluding a previous block of index 5 that is most recently added, redundancy between a previous block with index 4 and 3 and some merge candidates in a merge candidate list may be checked.

As a result of redundancy check, if there is even one previous block with different motion information, a corresponding previous block may be added to a merge candidate list. Alternatively, if there is even one previous block with the same motion information, a previous block in a motion information list may not be added to a merge candidate list. On the other hand, if there is no previous block with the same motion information, all or part of previous blocks in a motion information list may be added to a last position of a merge candidate list. In this case, it may be added to a merge candidate list in the order of previous blocks recently added to a motion information list (i.e., from a block with a large index to a block with a small index). However, there may be a limit that a previous block most recently added to a motion information list (i.e., a previous block with the largest index) is not added to a merge candidate list. The previous block may be added by considering a size of a merge candidate list. For example, according to size information of a merge candidate list described above, it is assumed that a merge candidate list has a maximum of T merge candidates. In this case, there may be a limit that a previous block is added until the number of merge candidates belonging to a merge candidate list reaches (T-n). Here, n may be an integer of 1, 2 or more. Alternatively, a previous block may be added repeatedly until the number of merge candidates belonging to a merge candidate list reaches T.

A decoding device may derive motion information of a current block based on a merge candidate list and a merge index (merge_idx) S710. A merge index may specify any one of a plurality of merge candidates belonging to a merge candidate list. Motion information of a current block may be configured as motion information of a merge candidate specified by a merge index. As an example, for an AMVP mode, the merge index may be an AMVP flag, a MVP flag, an AMVP index or a MVP index.

A decoding device may perform motion compensation of a current block based on derived motion information S720. In an embodiment, pre-derived motion information (in particular, a motion vector) may be corrected based on a predetermined different motion vector (MVD). Motion compensation may be performed by using a corrected motion vector. Meanwhile, the motion information list may be updated based on pre-derived motion information for a current block.

Figure 8:
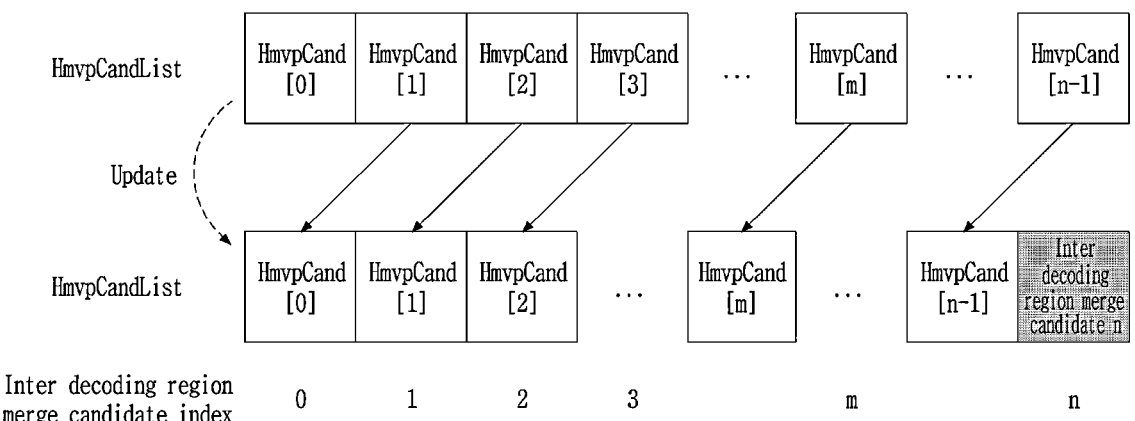
FIGS. 8 to 10 are a diagram illustrating a method for configuring and updating a motion information list according to an embodiment of the present disclosure.
Figure 9:
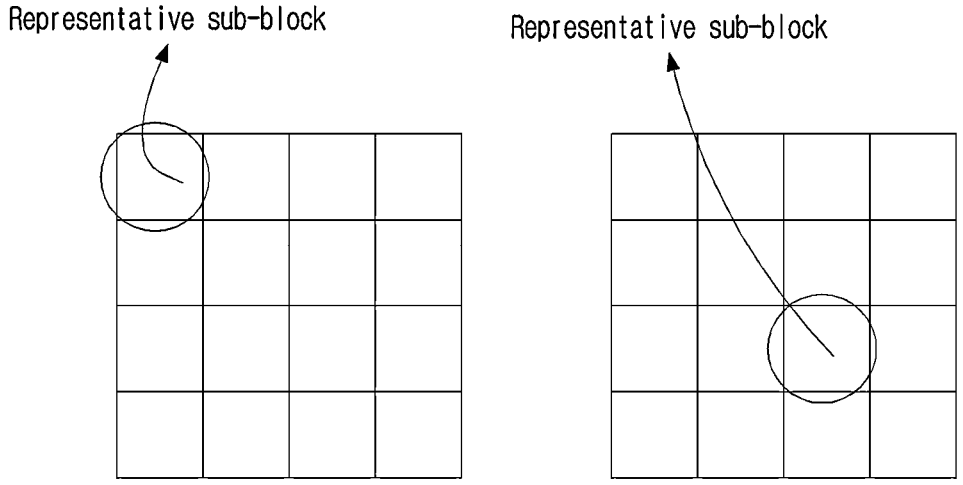
Figures 10, 11:
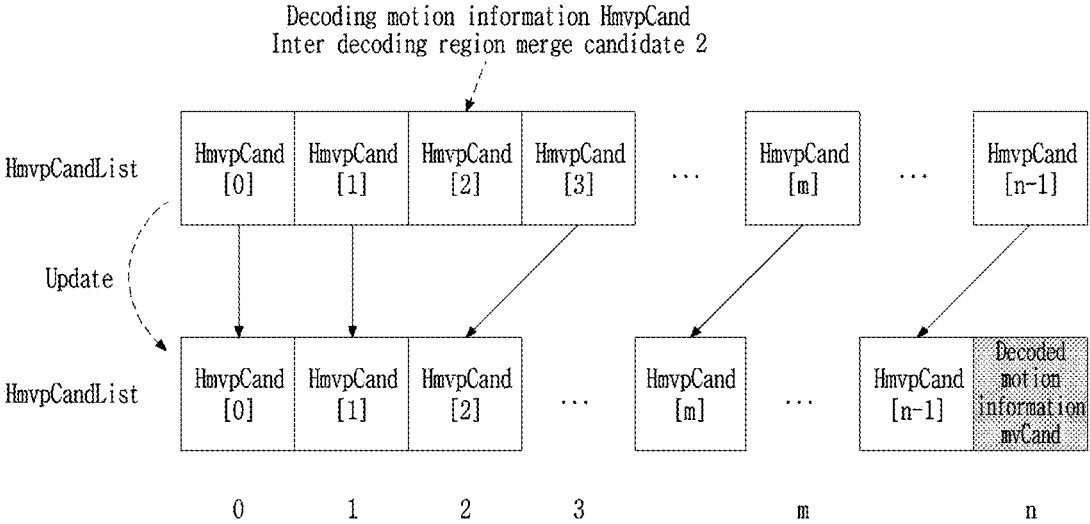
FIGS. 11 and 12 are a diagram for describing a problem caused by a conventional method for configuring and updating a HMVP list.

FIGS. 8 to 10 are a diagram illustrating a method for configuring and updating a motion information list according to an embodiment of the present disclosure.

Motion information of a coding unit that is already encoded by inter prediction in a current picture (including at least one of a motion vector, a reference picture index or prediction direction information) may be stored in a list of a pre-defined size, which is defined as an inter-region motion information list or a motion information list. Motion information in an inter-region motion information list is called an inter-area merge candidate. An inter-region merge candidate may be used as a merge candidate of a current coding unit, and this method is defined as an inter-region merge method.

An inter-region motion information list may be initialized at a predefined level. For example, an inter-region motion information list may be initialized in a unit of a slice. Alternatively, for example, an inter-region motion information list may be initialized in a unit of a CTU line (or row). When initialized, an inter-region motion information list is empty, and when some regions of a picture are encoded/decoded, encoded/decoded motion information may be added to an inter-region motion information list. As another example, an initial inter-region merge candidate of an inter-region motion information list may be signaled.

When a coding unit is encoded/decoded by inter prediction, motion information of the coding unit may be updated in an inter-region motion information list as in FIG. 8. If the number of inter-region merge candidates in an inter-region motion information list reaches a predetermined maximum number, a value with the smallest index (motion information first added to an inter-region motion information list) may be removed from an inter-region motion information list, and motion information of the most recently encoded/decoded inter-region may be added to an inter-region motion information list.

Motion vector mvCand of a decoded coding unit may be updated in inter-region motion information list HmvpCandList. In this case, a redundancy check may be performed on motion information that is newly inserted before update. Specifically, if motion information of a decoded coding unit is the same as any one of motion information in an inter-region motion information list (e.g., if both a motion vector and a reference index are the same), an inter-region motion information list may not be updated, or as in FIG. 10, motion information that already exists may be deleted and motion information of a decoded coding unit (e.g., motion vector mvCand) may be stored last in an inter-region motion information list.

In this case, when an index of HmvpCandList having the same motion information as mvCand is called hIdx, HMVPCandList[i] may be configured as HVMPCandList[i−1] for all i greater than hIdx, as in FIG. 10. If a sub-block merge candidate is used in a currently decoded coding unit, motion information of a representative sub-block within a coding unit may be also stored in an inter-region motion information list. A sub-block merge candidate may refer to a method in which one coding block is partitioned into a plurality of sub-blocks and motion information is derived in a unit of a sub-block. As an example, a representative sub-block within a coding unit may be configured as a top-left sub-block within a coding unit as in FIG. 9, or may be configured as an intermediate sub-block within a coding unit.

A total of NumHmvp motion information may be stored in an inter-region motion information list, and NumHmvp is defined as a size of an inter-region motion information list. A size of an inter-region motion information list may use a pre-defined value. A size of an inter-region motion information list may be signaled at a pre-defined higher level. For example, a size of an inter-region motion information list may be signaled at a level of a sequence, a picture and a slice. As an example, a size of an inter-region motion information list may be defined as 16, 6 or 5.

There may be a limit that a coding unit that is inter prediction and has an affine motion vector does not have an inter-region motion information list. Alternatively, when it is inter prediction and has an affine motion vector, an affine sub-block vector may be added to an inter-region motion information list. Here, a position of a sub-block may be configured as a top-left sub-block, a top-right sub-block or a center sub-block, etc. Alternatively, a motion vector average value of each control point may be added to an inter-region merge candidate list.

If motion vector MV0 derived by performing encoding/decoding for a specific coding unit is the same as any one of inter-region merge candidates, MV0 may not be added to an inter-region motion information list. Alternatively, the existing inter-region merge candidate having the same motion vector as MV0 may be deleted and MV0 may be newly included in a decoding region merge candidate to update an index allocated to MV0.

Motion information and partition information or shape of a coding unit may be stored in an inter-region motion information list. An inter-region merge method may be performed by using only an inter-region merge candidate whose partition information and shape are similar to those of a current coding unit. Alternatively, an inter-region merge candidate list may be individually configured according to a block shape. In this case, according to a shape of a current block, one of a plurality of inter-region merge candidate lists may be selected and used.

Below, a method for generating and using more diverse candidates is described regarding a method for storing and using a HMVP (History-based MVP) candidate used in an INTER and MERGE/SKIP mode.

Figure 12:
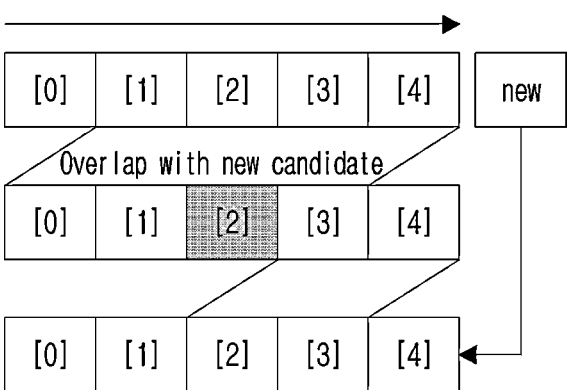

FIGS. 11 and 12 are a diagram for describing a problem caused by a conventional method for configuring and updating a HMVP list.

Referring to FIG. 11, motion information of previously decoded block may be stored in a buffer as a HMVP candidate and used as a MVP of a current block. It is considered as a HMVP candidate in the previously encoded/decoded order, and motion information of a block other than an INTRA/IBC block may be stored as it is. Herein, HMVP represents motion information of a previously decoded block. HMVP may represent motion information of a coding unit that is already encoded by inter prediction in a current picture. Of course, a HMVP is not limited to its name, and as an example, it may be an inter-region merge candidate described above in FIGS. 8 to 10. Herein, a HMVP candidate may be included in a HMVP list, and may be abbreviated as HMVP. In addition, herein, a HMVP list is not limited to its name, and as an example, it may be an inter-region motion information list or a motion information list described above in FIGS. 8 to 10. In addition, herein, a HMVP list may be referred to as a HMVP candidate list, a candidate list, a motion information candidate list, a buffer, a HMVP buffer, a table, a HMVP table, a lookup table, a HMVP lookup table, etc.

Referring to FIG. 11, a HMVP list may be configured based on motion information of a block encoded/decoded before a current block. A previously encoded/decoded block may be added to a HMVP list as it is according to it has bidirectional motion information or unidirectional motion information.

Referring to FIG. 12, motion information of a decoded block may be stored as a HMVP candidate in a buffer of a fixed size. A HMVP candidate stored in a buffer may be updated in a First In First Out (FIFO) manner. In this case, a variety of candidates may be stored by checking redundancy with other candidates stored in a buffer. As an embodiment, a buffer may be initialized in a unit of a CTU row to enable parallel encoding/decoding.

When a candidate overlapping with a new candidate exists in a buffer, a corresponding candidate may be removed from a buffer and may be newly stored in a storage position of a recent candidate (a last entry on a HMVP buffer index). As redundancy check is performed, when whether it is unidirectional/bidirectional and whether L0/L1 is redundant is determined and motion information of both L0 and L1 are the same, a corresponding candidate may be removed. It means that when motion information in one direction out of motion information in each prediction direction is the same and motion information in another direction is different, a corresponding candidate is stored in a HMVP buffer without deduplication, which may hinder the generation of various candidates in each prediction direction.

Below, a method for storing motion information of a previously coded block by separating a prediction direction is proposed. Specifically, in storing motion information of a previously encoded/decoded block, a method for considering a variety of candidates in each prediction direction by separating and storing L0 and L0 motion information and separating L0 and L1 and checking their redundancy is proposed.

Figure 13:
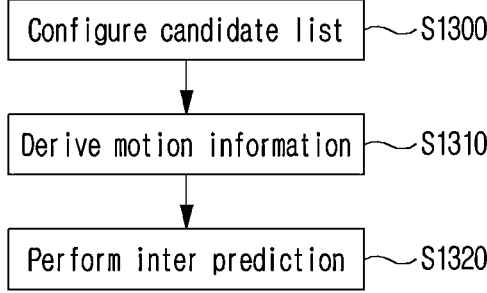
FIG. 13 shows an image decoding method performed by a decoding device according to an embodiment of the present disclosure.

FIG. 13 shows an image decoding method performed by a decoding device according to an embodiment of the present disclosure.

Referring to FIG. 13, a decoding device may configure a candidate list of a current block S1300. The candidate list may be a candidate list for inter prediction. As an example, it may be a merge candidate list or an AMVP candidate list. The candidate list may include a plurality of candidates. According to an embodiment of the present disclosure, the plurality of candidates may include a HMVP candidate.

According to an embodiment of the present disclosure, a HMVP candidate may be derived from a HMVP list separated according to a prediction direction (i.e., L0, L1). A decoding device may store motion information in a corresponding direction in a separated HMVP list without information about a prediction direction. A decoding device may individually perform redundancy check in a HMVP list in each direction. It is described in detail later by referring to FIG. 14.

In addition, according to an embodiment of the present disclosure, a decoding device may add candidates in a separated HMVP list to a merge/inter/AMVP candidate list (herein, may be collectively referred to as a candidate list) as a candidate in various combinations. As an example, a decoding device may generate a bidirectional prediction candidate by combining a candidate from a separated HMVP list. In addition, as an example, a decoding device may generate a bidirectional or unidirectional prediction candidate based on an index allocated to a candidate in a HMVP list. In addition, as an example, a decoding device may generate a mirroring-based bidirectional candidate when only unidirectional information exists (ex. the same index candidate). It is described in detail later by referring to FIGS. 15 to 19.

In addition, according to an embodiment of the present disclosure, a decoding device may generate a bidirectional candidate combined by averaging at least two candidates included in each separated HMVP list. As an example, a decoding device may generate a bidirectional prediction candidate by combining a candidate in each inserted order within a separated HMVP list. In addition, according to an embodiment of the present disclosure, a decoding device may configure a HMVP list using a single buffer. As an example, a decoding device may configure a HMVP list that includes combined bidirectional motion information generated by bidirectionally combining motion information of a previously decoded block as a candidate. It is described in detail later by referring to FIGS. 20 to 21.

In addition, according to an embodiment of the present disclosure, a decoding device may add a HMVP candidate in a separate HMVP list in a corresponding direction to a candidate list generated for each direction in an AMVP mode. It is described in detail later by referring to FIG. 22.

A decoding device may derive motion information of a current block based on the candidate list S1310. A decoding device may obtain index information or flag information specifying a candidate used for inter prediction of a current block among candidates included in a candidate list.

A decoding device may perform inter prediction based on derived motion information S1320. A decoding device may generate a prediction sample for the current block based on derived motion information. A current block including the prediction sample may be referred to as a prediction block.

FIG. 14 is a diagram illustrating a method for configuring a candidate list according to an embodiment of the present disclosure.

According to an embodiment of the present disclosure, a decoding device may separate a prediction direction and store motion information of a previously encoded/decoded block. In other words, as an embodiment, a L0 and L1 separate buffer may be used. In other words, a L0 candidate list including L0 motion information of a previously coded block and a L1 candidate list including L1 motion information of a previously coded block may be configured. Herein, a L0 and L1 separated buffer or list may be referred to as a L0 candidate list and a L1 candidate list, respectively. It is not limited thereto, and a L0 candidate list may be referred to as a L0 list, a L0 HMVP list, a first candidate list, a first HMVP list, a L0 table, a L0 HMVP table, a first table, a first lookup table, etc., and a L1 candidate list may be referred to as a L1 list, a L1 HMVP list, a second candidate list, a second HMVP list, a L1 table, a L1 HMVP table, a second table, a second lookup table, etc.

Referring to FIG. 14, when a buffer size is N, there may be N HMVPs. In this embodiment, a HMVP candidate may be expressed as HMVPCand[0]~HMVPCand[N−1]. Unlike storing both a prediction direction (inter_dir) and motion information (refIdx0, MV0, refIdx1, MV1) in each direction in the prior art, L0 and L1 motion information may be stored respectively without information on a prediction direction. Since redundancy check is performed within each buffer, the number of candidates in a buffer for L0 and L1 may be changed, and candidates included in a L0 and L1 separation buffer may not be paired each other.

In an embodiment of the present disclosure, since a prediction direction is determined by a combination of candidates included in each buffer by using a separate buffer, there is no need to store information showing a prediction direction. Due to it, a size of a HMVP buffer may be reduced. In addition, as described above, since unpaired motion information is used through a combination of candidates included in a L0 and L1 separation buffer, information inherited from a previously coded block that additionally corresponds other than a reference picture index and a motion vector of a candidate may as follows. As an example, inherited information of a coded block may not be considered. In this case, the inherited information may be information related to Bi-prediction with CU-level Weights (BCW), a Half-pel Interpolation Filter (H-pel IF), and Local Illumination Compensation (LIC) of the coded block.

Alternatively, as another embodiment, it may be determined according to inherited information of a candidate included in each separate buffer. For example, corresponding inherited information may be stored only when a BCW index of a L0 candidate is the same as that of a L1 candidate. In addition, corresponding inherited information may be stored only when a bidirectional H-pel IF is the same. Likewise, corresponding inherited information may be stored only when all bidirectional LIC flags are 1.

Alternatively, as another embodiment, inherited information of a coded block may be considered only when pairing of a L0 and L1 candidate is maintained.

Figure 16:
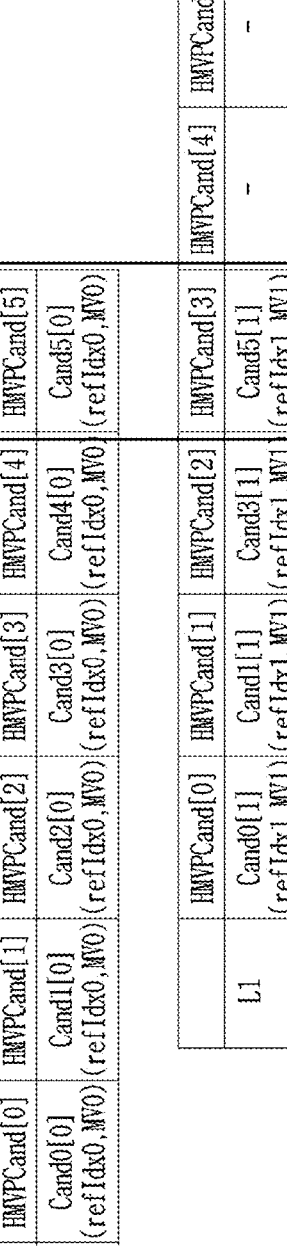

FIGS. 15 and 16 are a diagram illustrating a candidate derivation method based on a separated candidate list according to an embodiment of the present disclosure.

As described above in FIG. 14, a list divided into L0 and L1 may be configured based on motion information of a previously coded block. Referring to FIG. 15, a motion information candidate of each L0 and L1 may be included in an individually separated buffer, and redundancy check may be performed and updated within each list (or buffer). Due to it, the number of candidates included in each L0 and L1 list may be different.

As described above, a merge candidate list (or an AMVP candidate list) for motion prediction of a current block may be configured. The merge candidate list (or the AMVP candidate list) may include a plurality of merge candidates (or AMVP candidates). The plurality of merge candidates (or AMVP candidates) may include a HMVP candidate. A candidate included in a separated list according to an embodiment of the present disclosure may be used as a HMVP candidate as it is, or may be used as a HMVP candidate in combination with a candidate included in each prediction direction list. Herein, a candidate included in each prediction direction list may be referred to as a candidate, a L0/L1 candidate, a HMVP candidate or an element. In addition, a candidate included in each prediction direction list may be combined and a combined candidate may be used as a merge candidate. The combined candidate may be referred to as a HMVP candidate, a combined HMVP candidate, a combined candidate, a HMVP merge candidate, a combined HMVP merge candidate, a combined merge candidate, a HMVP AMVP candidate, a combined HMVP AMVP candidate, a combined AMVP candidate, etc.

Referring to FIG. 15, since redundancy check is individually performed in a separated buffer and non-overlapping motion information is added as a candidate, the number of motion information candidates included in a separated buffer may be different. When a buffer size for HMVP is N (assuming N>=6), there may be a case in which a L0 list includes 6 elements and L1 includes 4 elements, as in an example of FIG. 15.

Referring to FIG. 16, as an embodiment, a decoding device may store (or add) elements that are most recently inserted in each list in a merge candidate list based on elements included in each L0/L1 list of a HMVP candidate. In other words, a decoding device may add a merge candidate to a merge candidate list by combining an element in each direction in the order of insertion in each list. In describing an embodiment according to the present disclosure, for convenience of a description, it is described based on a case in which a merge candidate list is configured based on a merge candidate, but the present disclosure is not limited thereto. An embodiment according to the present disclosure may be applied substantially in the same way even when an inter prediction mode other than a merge mode is applied.

According to an embodiment of the present disclosure, when an element is inserted into a L0/L1 list as in FIG. 15, a candidate may be generated by combining an element included in each list, as in FIG. 16. In this case, a generated candidate may be a bi-prediction MVP.

As an embodiment, if the number of elements in a L0/L1 list is different, a possible candidate from a recent candidate may be rotated and combined. For example, when a L0/L1 list includes at least one element, a decoding device may generate a bi-directional MVP (i.e., a merge candidate) by using an element in each direction, and when there is a list that the number of elements is 0 among a L0/L1 list, it may generate a unidirectional MVP.

In addition, a HMVP candidate added to a merge candidate list may be determined according to the following equation.

$$MergeCand[i + x] = \qquad \text{[Equation 1]}$$
$$(L0\ MVP, L1\ MVP) = (\text{HMVPCand\_L0}[J - (x\ \%\ J) - 1],$$
$$\text{HMVPCand\_L1}[K - (x\ \%\ K) - 1])$$

In Equation 1, it is assumed that there are J L0 candidates and K L1 candidates and an application position (or an insertion position) of a HMVP candidate, a merge candidate in a merge candidate list, is i+x, x=0 . . . M−1.

FIG. 17 is a diagram illustrating a candidate derivation method based on a separated candidate list according to an embodiment of the present disclosure.

Referring to FIG. 17, as described above in FIG. 14, a list divided into L0 and L1 may be configured based on motion information of a previously coded block. Any related overlapping description is omitted.

When a HMVP candidate is added to a merge candidate list as a merge candidate, a decoding device may generate and apply (or insert) a merge candidate by pairing a L0 and L1 candidate with the same index, as shown in FIG. 17. In other words, a decoding device may derive a merge candidate by using an element with the same index in each list.

An index may be allocated respectively to a candidate included in a L0/L1 list, and a decoding device may add a candidate generated by combining a candidate with the same index in a L0/L1 list to a merge candidate list as a merge candidate. As an example, a bi-prediction candidate may be generated by pairing a L0 and L1 candidate with the same HMVPCand index, and if only a list in any one direction has a candidate, it may be used as a uni-prediction candidate.

FIG. 18 is a diagram illustrating a candidate derivation method based on a separated candidate list according to an embodiment of the present disclosure.

Referring to FIG. 18, as described above in FIG. 14, a list divided into L0 and L1 may be configured based on motion information of a previously coded block. Any related overlapping description is omitted.

When a HMVP candidate is added to a merge candidate list as a merge candidate, a decoding device may generate and apply (or insert) a merge candidate by pairing a L0 and L1 candidate with the same index, as shown in FIG. 18. In other words, a decoding device may derive a merge candidate by using an element with the same index in each list.

An index may be allocated respectively to a candidate included in a L0/L1 list, and a decoding device may add a candidate generated by combining a candidate with the same index in a L0/L1 list to a merge candidate list as a merge candidate. In this case, when there is only unidirectional motion information, a HMVP candidate with bidirectional motion information may be generated by mirroring motion information in another direction. In other words, as in FIG. 18, when a candidate with index 5 exists only in a L0 list, a L1 motion vector with index 5 may be derived as a value with the same size as that of a L0 motion vector but with a different sign. The same method may be also applied to a candidate with index 4. In addition, as an embodiment, scaling may be performed in mirroring by considering a distance and a direction of a mirrored reference picture.

FIG. 19 is a diagram illustrating a candidate derivation method based on a separated candidate list according to an embodiment of the present disclosure.

Referring to FIG. 19, as described above in FIG. 14, a list divided into L0 and L1 may be configured based on motion information of a previously coded block. Any related overlapping description is omitted.

As described above in FIG. 18, a decoding device may store (or insert) a candidate in each buffer and generate an empty candidate with mirroring, or as shown in FIG. 19, it may mirror a candidate that exists only in a unidirectional way and generate and add a candidate in another direction. In addition, in this process, when an overlapping candidate (or motion information) exist in a list in each direction, a value refined to a specific value may be added. As an example, +−1 movement information may be added.

A merge candidate configuration method described above in FIGS. 16 to 19 is an example, and of course, the order of insertion into a merge candidate list, a size of a HMVP list and the order/direction of a combination between elements in a list may be changed.

In addition, as an embodiment, a HMVP candidate that does not use a separation buffer and a HMVP that uses a separation buffer may be considered simultaneously. In this case, a merge candidate list may be configured by using a HMVP candidate that uses a separation buffer and a HMVP that uses a separation buffer. A method and order for configuring a candidate may be changed. In addition, redundancy check may be applied between candidates that do not use a separation buffer and candidates that use a separation buffer. As an example, the following matters may be considered in configuring a merge candidate list.

The number of HMVP candidates that do not use a separation buffer and HMVP candidates that use a separation buffer may vary.

A priority of a HMVP candidate may vary depending on whether a separation buffer is used. As an example, a HMVP candidate that does not use a separation buffer may be added preferentially.

A priority may be determined by considering a reference index. As an example, a candidate with a small reference index may be added preferentially.

Of course, a HMVP candidate described above in FIGS. 16 to 19 may be used as an AMVP candidate. In addition, candidates existing in a HMVP buffer may be considered as an AMVP candidate by combining them in order different from a merge mode, and the same method may be applied by considering convenience of implementation.

Figure 20:
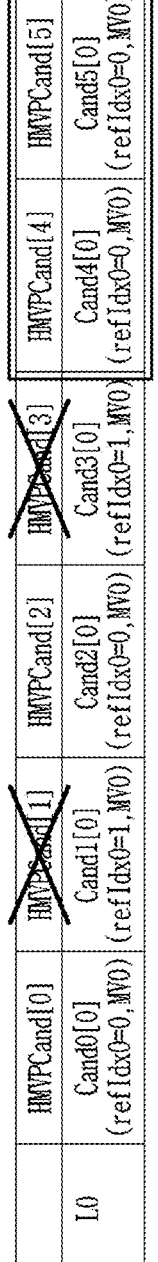
FIG. 20 is a diagram illustrating a candidate derivation method based on a separated candidate list according to an embodiment of the present disclosure.

FIG. 20 is a diagram illustrating a candidate derivation method based on a separated candidate list according to an embodiment of the present disclosure.

Referring to FIG. 20, as described above in FIG. 14, a list divided into L0 and L1 may be configured based on motion information of a previously coded block. Any related overlapping description is omitted.

A decoding device may store the most recently inserted candidate in a merge candidate list based on a L0 and L1 element of a HMVP list. In this case, a decoding device may generate a new combination of candidates by averaging a specific number of candidates in a list, as shown in FIG. 20, without using a candidate included in a HMVP list as it is.

A decoding device may perform averaging on a candidate having the same reference index. For example, as shown in FIG. 20, a new candidate may be generated by averaging two HMVP candidates with the same reference index per each direction. When a HMVP candidate application position in a merge candidate list is i+x, x=0 . . . M−1, a result of averaging two candidates may be inserted into a merge candidate list. A candidate inserted through average according to this embodiment may be referred to as a variety of names. A candidate inserted through average according to this embodiment may be referred to as, for example, a HMVP candidate, a combination candidate, a HMVP combination candidate, an average candidate, a HMVP average candidate, an average combination candidate, etc.

A method described in FIG. 20 is an example, and may be modified and applied in the following manner. In addition, it may be applied in a combination of all or part of the following embodiments.

It may be applied when there are at least two candidates in a HMVP buffer. A corresponding condition may be applied independently to each buffer, or may be applied simultaneously to a buffer in both directions.

Average be performed only on a candidate with a reference index of 0.

As a reference index increases from 0 to the maximum value of a reference index, average between candidates with the same reference index may be performed. Table 1 below shows an example in which a reference index distinguishes between a candidate with an index of 0 and a candidate with an index of 1 and performs average on a candidate with the same reference index.

TABLE 1

| #1 | RefIdx = 0 | Avg(HMVPCand[5], HMVPCand[4]) |
| #2 | | Avg(HMVPCand[5], HMVPCand[2]) |
| #3 | | Avg(HMVPCand[5], HMVPCand[0]) |
| #4 | | Avg(HMVPCand[4], HMVPCand[2]) |
| #5 | | Avg(HMVPCand[4], HMVPCand[0]) |
| #6 | | Avg(HMVPCand[2], HMVPCand[0]) |
| #7 | RefIdx = 1 | Avg(HMVPCand[3], HMVPCand[1]) |

A candidate may be averaged regardless of a reference index. In this case, a reference index may be determined as a predefined specific value (e.g., refIdx is fixed to 0).

A pairwise candidate generated by averaging two candidates may be excluded from a merge candidate list.

In the process of storing a decoded candidate in a HMVP list, only a candidate with a predefined reference index (e.g., refIdx is 0) may be stored.

A limit may be applied, including allowing only a determined number of averaged candidates.

It is possible to preferentially combine and apply a recent candidate existing in a HMVP list.

An embodiment listed above is an example, and of course, the order of insertion into a merge candidate list, a size of a HMVP list, and the order/direction of combinations (or averages) between elements in a list may be changed.

In addition, even when a separation buffer is not used, a merge candidate list may be configured by averaging a candidate rather than using an existing HMVP candidate as it is. In this case as well, only a candidate with a reference index of 0 may be averaged, or a candidate with the same reference index may be averaged. In addition, it may be averaged regardless of a reference index, and it may be modified by designating and using a reference index as a predefined specific value (e.g., 0, 1). In addition, a limit may be applied, including allowing only a predefined number of averaged candidates.

In addition, as an embodiment, a HMVP candidate that does not use a separation buffer and a HMVP that uses a separation buffer may be considered simultaneously. In this case, a merge candidate list may be configured by using a HMVP candidate that uses a separation buffer and a HMVP that uses a separation buffer. A method and order for configuring a candidate may be changed. In addition, redundancy check may be applied between candidates that do not use a separation buffer and candidates that use a separation buffer. As an example, the following matters may be considered in configuring a merge candidate list.

The number of HMVP candidates that do not use a separation buffer and HMVP candidates that use a separation buffer may vary.

A priority of a HMVP candidate may vary depending on whether a separation buffer is used. As an example, a HMVP candidate that does not use a separation buffer may be added preferentially.

A priority may be determined by considering a reference index. As an example, a candidate with a small reference index may be added preferentially.

Of course, the HMVP candidate described above in FIG. 20 can be used as an AMVP candidate. In addition, candidates existing in a HMVP buffer may be considered as an AMVP candidate by combining them in order different from a merge mode, and the same method may be applied by considering convenience of implementation.

FIG. 21 is a diagram illustrating a candidate derivation method based on a separated candidate list according to an embodiment of the present disclosure.

Referring to FIG. 21, as described above in FIG. 14, a list divided into L0 and L1 may be configured based on motion information of a previously coded block. Any related overlapping description is omitted.

A decoding device may store the most recently inserted candidate in a merge candidate list based on a L0 and L1 element of a HMVP list. In this case, a decoding device does not use a candidate included in a HMVP list as it is, and as shown in FIG. 21, it may generate a new candidate by combining a L0 candidate and a L1 candidate by using HMVPCand included in a list in each direction. In FIG. 21, when a HMVP candidate insertion position in a merge candidate list is i+x, x=0 . . . M−1, a decoding device may insert a result of combining two candidates into a merge candidate list.

If a candidate combination illustrated in FIG. 21 is generalized, it may be represented as in Table 2 below.

candidate rather than using an existing HMVP candidate as it is. In this case as well, only a candidate with a reference index of 0 may be averaged, or a candidate with the same reference index may be averaged. In addition, it may be averaged regardless of a reference index, and it may be modified by designating and using a reference index as a predefined specific value (e.g., 0, 1). In addition, a limit may be applied, including allowing only a predefined number of averaged candidates.

In addition, as an embodiment, a HMVP candidate that does not use a separation buffer and a HMVP that uses a separation buffer may be considered simultaneously. In this case, a merge candidate list may be configured by using a HMVP candidate that uses a separation buffer and a HMVP that uses a separation buffer. A method and order for configuring a candidate may be changed. In addition, redundancy check may be applied between candidates that do not use a separation buffer and candidates that use a separation buffer. As an example, the following matters may be considered in configuring a merge candidate list.

The number of HMVP candidates that do not use a separation buffer and HMVP candidates that use a separation buffer may vary.

A priority of a HMVP candidate may vary depending on whether a separation buffer is used. As an example, a HMVP candidate that does not use a separation buffer may be added preferentially.

A priority may be determined by considering a reference index. As an example, a candidate with a small reference index may be added preferentially.

Of course, the HMVP candidate described above in FIG. 21 can be used as an AMVP candidate. In addition, candidates existing in a HMVP buffer may be considered as an AMVP candidate by combining them in order different from a merge mode, and the same method may be applied by considering convenience of implementation.

In addition, according to another embodiment of the present disclosure, when it is desired to generate a candidate through a combination of candidates for each list without using a candidate included in a HMVP buffer as it is based on each of a L0 and L1 element of a HMVP candidate, a separation buffer may not be used.

As an embodiment, in order to combined candidate, there may be a limit that the number of L0 candidates is the same as that of L1 candidates. For example, only motion information of a bidirectional prediction block may be configured as a HMVP candidate. In this case, since the number of

TABLE 2

|  | 0 | 1 | 2 | 3 | 4 | 5 | 6 | 7 | 8 | 9 | 10 | 11 | 12 | 13 | 14 | ... |
|---|---|---|---|---|---|---|---|---|---|---|---|---|---|---|---|---|
| L0 | J-1 | J-1 | J-2 | J-2 | J-1 | J-3 | J-2 | J-3 | J-3 | J-1 | J-4 | J-2 | J-4 | J-3 | J-4 | ... |
| L1 | K-1 | K-2 | K-1 | K-2 | K-3 | K-1 | K-3 | K-2 | K-3 | K-4 | K-1 | K-4 | K-2 | K-4 | K-3 | ... |

Referring to Table 2, when there are J candidates in a L0 list and K candidates in a L1 list, 0 . . . J−1 and 0 . . . K−1 may be allocated to a candidate indix for each of L0 and L1, respectively. In other words, if a candidate in a L0 and L1 list is combined in insertion order first, it may be represented as in Table 2.

This embodiment is an example, and of course, the order of insertion into a merge candidate list, a size of a HMVP list, and the order/direction of combinations (or averages) between elements in a list may be changed.

In addition, even when a separation buffer is not used, a merge candidate list may be configured by averaging a candidates in each list may vary due to redundancy check per list when using a separation buffer, a candidate may be configured based on a single buffer without using a separation buffer.

In this case, in order to secure diversity of a candidate, instead of using motion information of a decoded previous block as a merge candidate, only a candidate with a different index in a L0 and L1 list may be combined to configure a merge candidate. Table 3 below shows an example of allowing only a combination with a different index within a list in each direction.

TABLE 3

| | 0 | 1 | 2 | 3 | 4 | 5 | 6 | 7 | 8 | 9 | 10 | 11 | 12 | 13 | 14 | ... |
|---|---|---|---|---|---|---|---|---|---|---|---|---|---|---|---|---|
| L0 | J-1 | J-1 | J-2 | J-2 | J-1 | J-3 | J-2 | J-3 | J-3 | J-1 | J-4 | J-2 | J-4 | J-3 | J-4 | ... |
| L1 | K-1 | K-2 | K-1 | K-2 | K-3 | K-1 | K-3 | K-2 | K-3 | K-4 | K-1 | K-4 | K-2 | K-4 | K-3 | ... |

Referring to Table 3, there may be J L0 candidates and K L1 candidates (J=K). In this case, index 00 . . . J−1, 0 . . . K−1 may be allocated to each L0 and L1 candidate. As in an example of Table 3, a merge candidate may be derived by combining a candidate in a L0/L1 list with a different index in the order of recent insertion.

This embodiment is an example, and of course, the order of insertion into a merge candidate list, a size of a HMVP list, and the order/direction of combinations (or averages) between elements in a list may be changed.

In addition, even when a separation buffer is not used, a merge candidate list may be configured by averaging a candidate rather than using an existing HMVP candidate as it is. In this case as well, only a candidate with a reference index of 0 may be averaged, or a candidate with the same reference index may be averaged. In addition, it may be averaged regardless of a reference index, and it may be modified by designating and using a reference index as a predefined specific value (e.g., 0, 1). In addition, a limit may be applied, including allowing only a predefined number of averaged candidates.

In addition, as an embodiment, a HMVP candidate that does not use a separation buffer and a HMVP that uses a separation buffer may be considered simultaneously. In this case, a merge candidate list may be configured by using a HMVP candidate that uses a separation buffer and a HMVP that uses a separation buffer. A method and order for configuring a candidate may be changed. In addition, redundancy check may be applied between candidates that do not use a separation buffer and candidates that use a separation buffer. As an example, the following matters may be considered in configuring a merge candidate list.

The number of HMVP candidates that do not use a separation buffer and HMVP candidates that use a separation buffer may vary.
    A priority of a HMVP candidate may vary depending on whether a separation buffer is used. As an example, a HMVP candidate that does not use a separation buffer may be added preferentially.
    A priority may be determined by considering a reference index. As an example, a candidate with a small reference index may be added preferentially.
    Of course, the above-described HMVP candidate may be used as an AMVP candidate. In addition, candidates existing in a HMVP buffer may be considered as an AMVP candidate by combining them in order different from a merge mode, and the same method may be applied by considering convenience of implementation.

Figure 22:
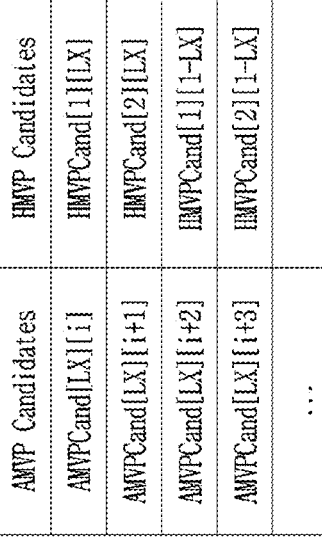
FIG. 22 is a diagram illustrating a candidate derivation method based on a separated candidate list according to an embodiment of the present disclosure.

FIG. 22 is a diagram illustrating a candidate derivation method based on a separated candidate list according to an embodiment of the present disclosure.

Referring to FIG. 22, a method for configuring a HMVP candidate as an AMVP candidate when using a buffer separated into L0 and L1 by using a method described above in FIGS. 14 to 21 is described. In other words, a decoding device may use a method described above in FIGS. 14 to 21 to add a HMVP candidate in a separate HMVP list for a corresponding direction to a candidate list generated for each direction in an AMVP mode.

Since an AMVP candidate configures a candidate per each list, a candidate per each list in each separate buffer may be configured in order. As an embodiment, as shown in FIG. 22, in order to configure an AMVP candidate in a LX direction (here, X may be 0 or 1), motion information in a LX direction of each HMVP candidate may be considered, and if a corresponding direction is not available, motion information in a 1-LX direction (i.e., another direction) may be considered. In addition, when a separate buffer is used and a candidate for each list is stored in a HMVP buffer, a HMVP candidate may be configured by giving priority to a candidate in a corresponding list.

As an embodiment, as shown in FIG. 22, the existing HMVP candidate may be given priority and a LX and 1-LX candidate may be alternately considered in a corresponding candidate. Alternatively, as an example, after considering all HMVP candidates in a LX list by giving priority to each list, if all candidates are not filled (i.e., if the maximum number is not satisfied), 1-LX HMVP may be considered. Through this, a variety of candidates may be considered per each list.

FIG. 23 shows a rough configuration of an inter predictor 332 that performs an image decoding method according to an embodiment of the present disclosure.

Referring to FIG. 23, an inter predictor 332 may include a candidate list configuration unit 2300, a motion information derivation unit 2310 and a prediction sample generation unit 2320.

A candidate list configuration unit 2300 may configure a candidate list of a current block. The candidate list may be a candidate list for inter prediction. As an example, it may be a merge candidate list or an AMVP candidate list. The candidate list may include a plurality of candidates. According to an embodiment of the present disclosure, the plurality of candidates may include a HMVP candidate.

According to an embodiment of the present disclosure, a HMVP candidate may be derived from a HMVP list separated according to a prediction direction (i.e., L01, L1). A decoding device may store motion information in a corresponding direction in a separated HMVP list without information about a prediction direction. A decoding device may individually perform redundancy check in a HMVP list in each direction. It is the same as described above by referring to FIG. 14, and here, a detailed description is omitted.

In addition, according to an embodiment of the present disclosure, a decoding device may add candidates from a separated HMVP list as a candidate to a merge/inter/AMVP candidate list (in the present disclosure, it may be collectively referred to as a candidate list) in various combinations. As an example, a decoding device may generate a bidirectional prediction candidate by combining a candidate from a separated HMVP list. In addition, as an example, a decoding device may generate a bidirectional or unidirectional prediction candidate based on an index allocated to a candidate in a HMVP list. In addition, as an example, a decoding device may generate a mirroring-based bidirectional candidate when only unidirectional information exists (ex. the same index candidate). It is the same as described above by referring to FIGS. 15 to 19, and here, a detailed description is omitted.

In addition, according to an embodiment of the present disclosure, a decoding device may generate a bidirectional candidate combined by averaging at least two candidates included in each separated HMVP list. As an example, a decoding device may generate a bidirectional prediction candidate by combining a candidate in each inserted order within a separated HMVP list. In addition, according to an embodiment of the present disclosure, a decoding device may configure a HMVP list using a single buffer. As an example, a decoding device may configure a HMVP list that includes combined bidirectional motion information generated by bidirectionally combining motion information of a previously decoded block as a candidate. It is the same as described above by referring to FIGS. 20 and 21, and here, a detailed description is omitted.

In addition, according to an embodiment of the present disclosure, a decoding device may add a HMVP candidate in a separate HMVP list in a corresponding direction to a candidate list generated for each direction in an AMVP mode. It is the same as described above by referring to FIG. 22, and here, a detailed description is omitted.

A motion information derivation unit 2310 may derive motion information of a current block based on the candidate list. A motion information derivation unit 2310 may obtain index information or flag information that specifies a candidate used for inter prediction of a current block among candidates included in a candidate list.

A prediction sample generation unit 2320 may perform inter prediction based on derived motion information. A prediction sample generation unit 2320 may generate a prediction sample for the current block based on derived motion information. A current block including the prediction sample may be referred to as a prediction block.

Figure 24:
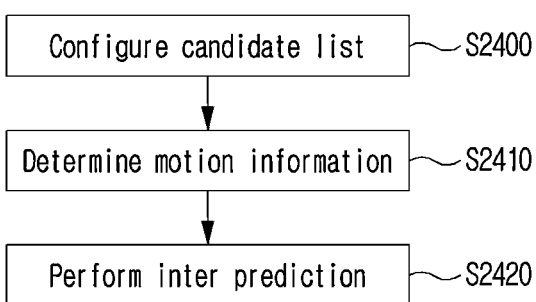
FIG. 24 shows an image encoding method performed by an encoding device according to an embodiment of the present disclosure.

FIG. 24 shows an image encoding method performed by an encoding device according to an embodiment of the present disclosure.

Hereinafter, an image decoding method described by referring to FIGS. 13 to 22 may be applied equally/similarly to an image encoding method according to the present disclosure, and an overlapping description is omitted.

Referring to FIG. 24, an encoding device (i.e., an encoder) may configure a candidate list of a current block S2400. The candidate list may be a candidate list for inter prediction. As an example, it may be a merge candidate list or an AMVP candidate list. The candidate list may include a plurality of candidates. According to an embodiment of the present disclosure, the plurality of candidates may include a HMVP candidate.

According to an embodiment of the present disclosure, a HMVP candidate may be derived from a HMVP list separated according to a prediction direction (i.e., L0, L1). An encoding device may store motion information in a corresponding direction in a separated HMVP list without information on a prediction direction. An encoding device may individually perform redundancy check in a HMVP list in each direction. It is the same as described above by referring to FIG. 14, and here, a detailed description is omitted.

In addition, according to an embodiment of the present disclosure, an encoding device may add candidates from a separated HMVP list as a candidate to a merge/inter/AMVP candidate list (in the present disclosure, it may be collectively referred to as a candidate list) n various combinations. As an example, an encoding device may generate a bidirectional prediction candidate by combining a candidate in a separate HMVP list. In addition, as an example, an encoding device may generate a bidirectional or unidirectional prediction candidate based on an index allocated to a candidate in a HMVP list. In addition, as an example, an encoding device may generate a mirroring-based bidirectional candidate when only unidirectional information exists (ex. the same index candidate). It is the same as described above by referring to FIGS. 15 to 19, and here, a detailed description is omitted.

In addition, according to an embodiment of the present disclosure, an encoding device may generate a combined bidirectional candidate by averaging at least two candidates included in each separate HMVP list. As an example, an encoding device may generate a bidirectional prediction candidate by combining a candidate in the order of each insertion within a separate HMVP list. In addition, according to an embodiment of the present disclosure, an encoding device may configure a HMVP list using a single buffer. As an example, an encoding device may configure a HMVP list that includes combined bidirectional motion information generated by bidirectionally combining motion information of a previously coded block as a candidate. It is the same as described above by referring to FIGS. 20 and 21, and here, a detailed description is omitted.

In addition, according to an embodiment of the present disclosure, an encoding device may add a HMVP candidate in a separate HMVP list in a corresponding direction to a candidate list generated for each direction in an AMVP mode. It is the same as described above by referring to FIG. 22, and here, a detailed description is omitted.

An encoding device may determine motion information of a current block based on the candidate list S2410. An encoding device may signal index information or flag information specifying a candidate used for inter prediction of a current block among candidates included in a candidate list to a decoder.

An encoding device may perform inter prediction based on derived motion information S2420. An encoding device may generate a prediction sample for the current block based on derived motion information. A current block including the prediction sample may be referred to as a prediction block.

Figure 25:
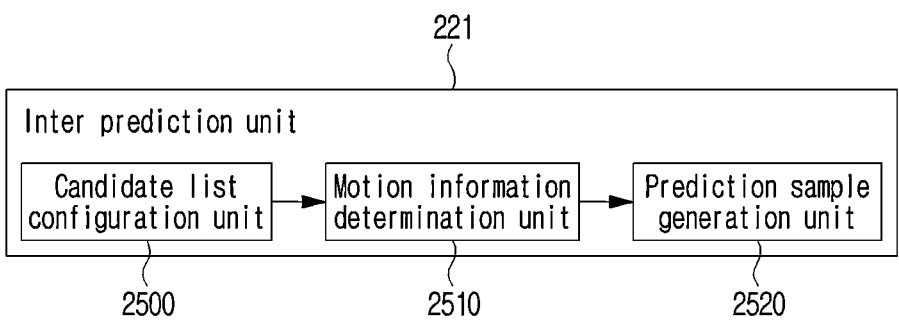
FIG. 25 shows a rough configuration of an inter predictor that performs an image encoding method according to an embodiment of the present disclosure.

FIG. 25 shows a rough configuration of an inter predictor 221 that performs an image encoding method according to an embodiment of the present disclosure.

Referring to FIG. 25, an inter predictor 221 may include a candidate list configuration unit 2500, a motion information determination unit 2510 and a prediction sample generation unit 2520.

Referring to FIG. 25, a candidate list configuration unit 2500 may configure a candidate list of a current block. The candidate list may be a candidate list for inter prediction. As an example, it may be a merge candidate list or an AMVP candidate list. The candidate list may include a plurality of candidates. According to an embodiment of the present disclosure, the plurality of candidates may include a HMVP candidate.

According to an embodiment of the present disclosure, a HMVP candidate may be derived from a HMVP list separated according to a prediction direction (i.e., L0, L1). An encoding device may store motion information in a corresponding direction in a separated HMVP list without information on a prediction direction. An encoding device may individually perform redundancy check in a HMVP list in each direction. It is the same as described above by referring to FIG. 14, and here, a detailed description is omitted.

In addition, according to an embodiment of the present disclosure, an encoding device may add candidates from a separated HMVP list as a candidate to a merge/inter/AMVP candidate list (in the present disclosure, it may be collectively referred to as a candidate list) in various combinations. As an example, an encoding device may generate a bidirectional prediction candidate by combining a candidate in a separate HMVP list. In addition, as an example, an encoding device may generate a bidirectional or unidirectional prediction candidate based on an index allocated to a candidate in a HMVP list. In addition, as an example, an encoding device may generate a mirroring-based bidirectional candidate when only unidirectional information exists (ex. the same index candidate). It is the same as described above by referring to FIGS. 15 to 19, and here, a detailed description is omitted.

In addition, according to an embodiment of the present disclosure, an encoding device may generate a combined bidirectional candidate by averaging at least two candidates included in each separate HMVP list. As an example, an encoding device may generate a bidirectional prediction candidate by combining a candidate in the order of each insertion within a separate HMVP list. In addition, according to an embodiment of the present disclosure, an encoding device may configure a HMVP list using a single buffer. As an example, an encoding device may configure a HMVP list that includes combined bidirectional motion information generated by bidirectionally combining motion information of a previously coded block as a candidate. It is the same as described above by referring to FIGS. 20 and 21, and here, a detailed description is omitted.

In addition, according to an embodiment of the present disclosure, an encoding device may add a HMVP candidate in a separate HMVP list in a corresponding direction to a candidate list generated for each direction in an AMVP mode. It is the same as described above by referring to FIG. 22, and here, a detailed description is omitted.

A motion information determination unit 2510 may determine motion information of a current block based on the candidate list. A motion information determination unit 2510 may signal index information or flag information specifying a candidate used for inter prediction of a current block among candidates included in a candidate list to a decoder.

A prediction sample generation unit 2520 may perform inter prediction based on derived motion information. A prediction sample generation unit 2520 may generate a prediction sample for the current block based on derived motion information. A current block including the prediction sample may be referred to as a prediction block.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding device and/or a decoding device according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding device and an encoding device to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 26:
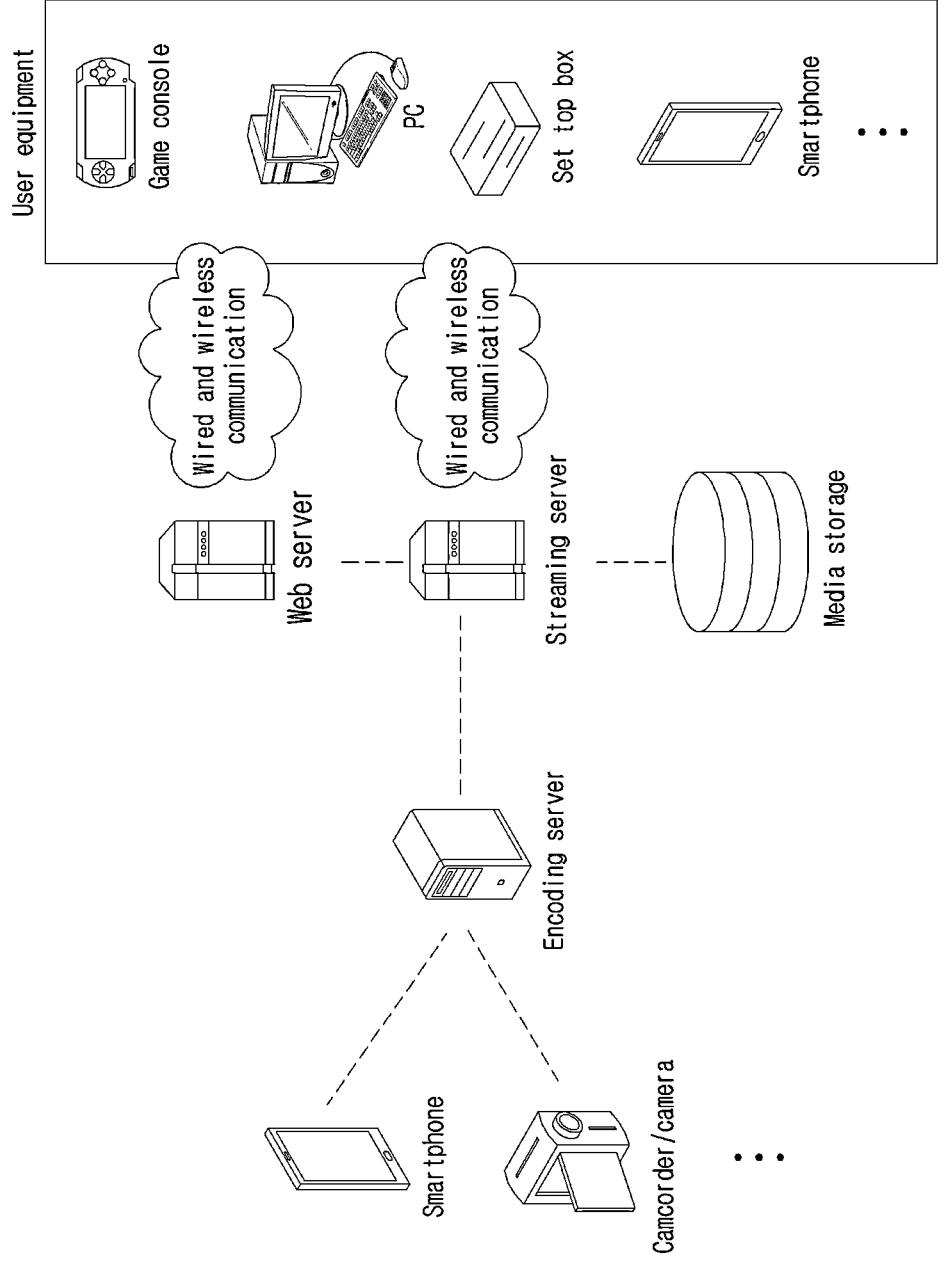
FIG. 26 shows an example of a contents streaming system to which embodiments of the present disclosure may be applied.

FIG. 26 shows an example of a contents streaming system to which embodiments of the present disclosure may be applied.

Referring to FIG. 26, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, the method comprising:
constructing a candidate list of a current block, wherein the candidate list includes a plurality of candidates, and the plurality of candidates include a history-based motion vector prediction (HMVP) candidate;
deriving motion information of the current block based on the candidate list; and
performing an inter prediction for the current block based on the motion information,
wherein the HMVP candidate is derived based on a plurality of HMVP lists,
wherein the plurality of HMVP lists include a first HMVP list related to only L0 motion information and a second HMVP list related to only L1 motion information,
wherein whether an L0 HMVP candidate with same motion information exists in the first HMVP list and whether an L1 HMVP candidate with same motion information exists in the second HMVP list are checked separately, and
wherein based on the first HMVP list and the second HMVP list respectively including one or more L0 HMVP candidates and one or more L1 HMVP candidates, the HMVP candidate is derived by bi-directional motion information generated based on a combination of a L0 HMVP candidate in the first HMVP list and a L1 HMVP candidate in the second HMVP list.

2. The method of claim 1,
wherein the L0 motion information includes at least one of a L0 reference index or a L0 motion vector,
wherein the L1 motion information includes at least one of a L1 reference index or a L1 motion vector.

3. The method of claim 1,
wherein in the first HMVP list and the second HMVP list, index values are individually assigned to the one or more L0 HMVP candidates and the one or more L1 HMVP candidates,
wherein the HMVP candidate is derived by using an L0 HMVP candidate and an L1 HMVP candidate having a same index value.

4. The method of claim 2,
wherein when a candidate having a specific index value exists only in one of the first HMVP list and the second HMVP list, a motion vector of a first direction of the HMVP candidate is derived as a motion vector of the candidate having the specific index value,
wherein a motion vector of a second direction of the HMVP candidate is derived as a value that a size is equal and a sign is opposite to the motion vector of the first direction.

5. The method of claim 1,
wherein the HMVP candidate is derived based on an average of an L0 HMVP candidate and an L1 HMVP candidate included in each of the first HMVP list and the second HMVP list.

6. The method of claim 1, wherein:
wherein in the first HMVP list and the second HMVP list, index values are individually assigned to the one or more L0 HMVP candidates and the one or more L1 HMVP candidates,
wherein the HMVP candidate is derived by using an L0 HMVP candidate having a first specific index value and an L1 HMVP candidate having a second specific index value in the first HMVP list and the second HMVP list, respectively.

7. An image encoding method, the method comprising:
constructing a candidate list of a current block, wherein the candidate list includes a plurality of candidates, and the plurality of candidates include a history-based motion vector prediction (HMVP) candidate;
determining motion information of the current block based on the candidate list; and
performing an inter prediction for the current block based on the motion information,
wherein the HMVP candidate is derived based on a plurality of HMVP lists,
wherein the plurality of HMVP lists includes a first HMVP list related to only L0 motion information and a second HMVP list related to only L1 motion information, and
wherein whether an L0 HMVP candidate with same motion information exists in the first HMVP list and whether an L1 HMVP candidate with same motion information exists in the second HMVP list are checked separately, and wherein based on the first HMVP list and the second HMVP list respectively including one or more L0 HMVP candidates and one or more L1 HMVP candidates, the HMVP candidate is derived by bi-directional motion information generated based on a combination of a L0 HMVP candidate in the first HMVP list and a L1 HMVP candidate in the second HMVP list.

8. A method for transmitting data for image information, the method comprising:

constructing a candidate list of a current block, wherein the candidate list includes a plurality of candidates, and the plurality of candidates include a history-based motion vector prediction (HMVP) candidate;

determining motion information of the current block based on the candidate list;

generating a prediction sample of the current block by performing an inter prediction for the current block based on the motion information;

generating a bitstream by encoding the current block based on the prediction sample of the current block; and transmitting data including the bitstream, wherein the HMVP candidate is derived based on a plurality of HMVP lists, wherein the plurality of HMVP lists includes a first HMVP list related to only L0 motion information and a second HMVP list related to only L1 motion information, and wherein whether an L0 HMVP candidate with same motion information exists in the first HMVP list and whether an L1 HMVP candidate with same motion information exists in the second HMVP list are checked separately, and wherein based on the first HMVP list and the second HMVP list respectively including one or more L0 HMVP candidates and one or more L1 HMVP candidates, the HMVP candidate is derived by bi-directional motion information generated based on a combination of a L0 HMVP candidate in the first HMVP list and a L1 HMVP candidate in the second HMVP list.

\* \* \* \* \*